((12)) United States Patent
Weis

(10) Patent No.: US 12,140,165 B2
(45) Date of Patent: Nov. 12, 2024

(54) DEVICE FOR HOLDING A STEM OF A HYDRAULIC CYLINDER IN POSITION, AND METHOD FOR UNBLOCKING AND BLOCKING A SECONDARY CHECK VALVE OF THE DEVICE

(71) Applicant: Neumeister Hydraulik GmbH, Neuenstadt (DE)

(72) Inventor: Michael Weis, Heilbronn (DE)

(73) Assignee: Neumeister Hydraulik GmbH, Neuenstadt (DE)

( * ) Notice: Subject to any disclaimer, the term of this patent is extended or adjusted under 35 U.S.C. 154(b) by 162 days.

(21) Appl. No.: 17/793,876

(22) PCT Filed: Feb. 16, 2021

(86) PCT No.: PCT/DE2021/100153
§ 371 (c)(1),
(2) Date: Jul. 19, 2022

(87) PCT Pub. No.: WO2021/204319
PCT Pub. Date: Oct. 14, 2021

(65) Prior Publication Data
US 2023/0055316 A1    Feb. 23, 2023

(30) Foreign Application Priority Data

Apr. 7, 2020    (DE) .................. 10 2020 109 615.1

(51) Int. Cl.
*F15B 13/01*    (2006.01)
*F16K 15/04*    (2006.01)
(Continued)

(52) U.S. Cl.
CPC ............ *F15B 13/01* (2013.01); *F16K 15/042* (2013.01); *F16K 15/066* (2013.01);
(Continued)

(58) Field of Classification Search
CPC .............. F15B 13/01; F15B 2211/3051; F15B 2211/30515; F15B 2211/8757; F16K 15/042; F16K 15/066; F16K 15/182
See application file for complete search history.

(56) References Cited

U.S. PATENT DOCUMENTS

| | | | | |
|---|---|---|---|---|
| 3,563,261 A * | 2/1971 | Griffith | ................ | F15B 13/015 137/102 |
| 3,795,178 A * | 3/1974 | Roche | ..................... | F15B 13/01 137/596.2 |
| 4,012,031 A * | 3/1977 | Mitchell | ................ | F15B 13/01 91/420 |
| 4,669,494 A * | 6/1987 | McBeth | ............... | F15B 13/015 91/420 |

(Continued)

FOREIGN PATENT DOCUMENTS

| | | |
|---|---|---|
| DE | 69727307 T2 | 11/2004 |
| DE | 10 2009 017 031 A1 | 10/2010 |

(Continued)

OTHER PUBLICATIONS

International Search Report in PCT/DE2021/100153, dated May 27, 2021.

*Primary Examiner* — Dustin T Nguyen
(74) *Attorney, Agent, or Firm* — Collard & Roe, P.C.

(57) ABSTRACT

A device for holding a hydraulic cylinder stem in position includes a hydraulic block having series-connected primary and secondary check valves. The latter includes a secondary control stem having a secondary valve body and a seal. A first throttle upstream and a second throttle downstream are closed in a secondary control stem closed position where the seal tightly blocks the secondary check valve, each throttle having a tiny throttle closing gap, preferably 0.1 mm or less. The control stem can move axially into an intermediate position where the throttles remain closed, that is, have a tiny closing gap, but valve body and seal are lifted from a secondary valve seat. The control stem can be moved further (Continued)

into an opening position where the throttles are open, each having an opening gap much larger than the closing gap, and the valve body and seal are lifted from the valve seat.

15 Claims, 11 Drawing Sheets

(51) Int. Cl.
  *F16K 15/06* (2006.01)
  *F16K 15/18* (2006.01)
(52) U.S. Cl.
  CPC ..... *F16K 15/182* (2021.08); *F15B 2211/3051* (2013.01); *F15B 2211/30515* (2013.01); *F15B 2211/8757* (2013.01)

(56) References Cited

U.S. PATENT DOCUMENTS

| | | | |
|---|---|---|---|
| 5,913,810 A | 6/1999 | Andre | |
| 7,434,593 B2 * | 10/2008 | Noll | F16K 15/066 137/454.2 |
| 9,068,322 B2 * | 6/2015 | Park | F15B 13/015 |
| 10,724,553 B2 * | 7/2020 | Zammuto | F15B 13/028 |
| 10,760,595 B2 | 9/2020 | Andre | |
| 2019/0032680 A1 | 1/2019 | Andre | |

FOREIGN PATENT DOCUMENTS

| | | |
|---|---|---|
| EP | 0 935 715 B1 | 1/2004 |
| KR | 100886373 B1 | 3/2009 |
| WO | 98/20260 A2 | 5/1998 |
| WO | 2017/191380 A1 | 11/2017 |

* cited by examiner

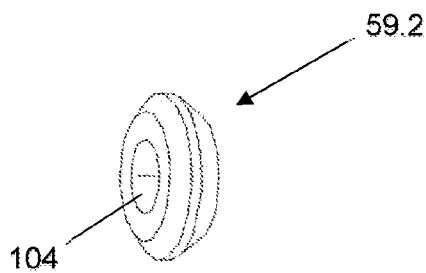
Fig. 10
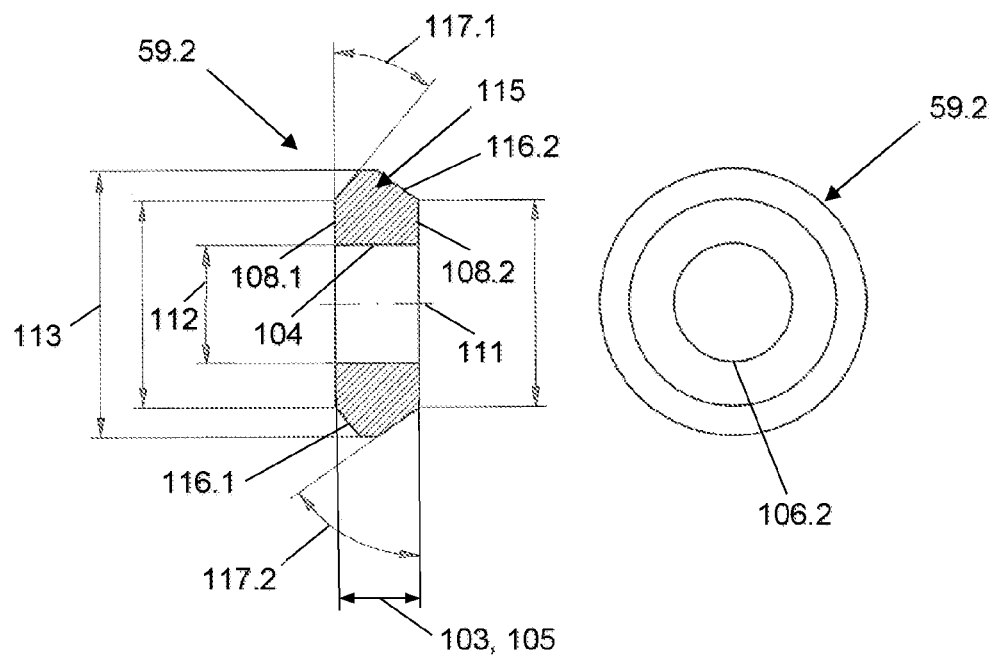
Fig. 11.1      Fig. 11.2

DEVICE FOR HOLDING A STEM OF A HYDRAULIC CYLINDER IN POSITION, AND METHOD FOR UNBLOCKING AND BLOCKING A SECONDARY CHECK VALVE OF THE DEVICE

CROSS REFERENCE TO RELATED APPLICATIONS

This application is the National Stage of PCT/DE2021/100153 filed on Feb. 16, 2021, which claims priority under 35 U.S.C. § 119 of German Application No. 10 2020 109 615.1 filed on Apr. 7, 2020, the disclosure of which is incorporated by reference. The international application under PCT article 21(2) was not published in English.

The invention relates to a device for holding a shaft, which is provided with a piston, of an at least single-acting hydraulic cylinder in a desired setting relative to the cylinder, which has a plurality, preferably two, work chambers for a drive fluid, the work chambers being separated from one another by the piston, wherein the shaft together with the piston is movable along the hydraulic cylinder, comprising a hydraulic block enclosing a lock chamber having a first opening, which is provided with a primary check valve and is in hydraulic connection with one work chamber of the work chambers, as well as a preferably opposite second opening which is provided with a secondary check valve and is in hydraulic connection with a hydraulic inlet for supply of the work chamber with the drive fluid, and wherein the primary check valve and the secondary check valve are connected in series or arranged one behind the other, and wherein the secondary check valve has a preferably central secondary control stem which extends, in particular, in the direction of its secondary control stem longitudinal axis and which is movable, preferably displaceable, relative to the hydraulic block in an axial direction, preferably also in the direction of its secondary control stem longitudinal axis, and which is provided with a secondary valve body, which is movable, preferably displaceable, in the axial direction relative to the hydraulic block by way of unblocking means, preferably a control stem of a control piston, from its secondary valve body closed setting, in which it bears against a preferably circular secondary valve seat of the hydraulic block under loading by a spring force of a secondary spring, against the spring force of the secondary spring into a secondary valve body open setting in which throughflow of the drive fluid through the secondary check valve is possible, and wherein the secondary valve body is provided with a resiliently compressible, preferably annular and especially circular, for example toroidal, seal, preferably of an elastomer, which in the secondary valve body closed setting of the secondary valve body tightly bears against a preferably circular contact surface of the secondary valve seat of the hydraulic block so that the secondary check valve is blocked against throughflow of the drive fluid, and wherein the secondary control stem in the secondary valve body closed setting of the secondary valve body, thus when the secondary check valve is closed, is in a secondary control stem closed setting and in the secondary valve body open setting of the secondary valve body, thus when the secondary check valve is open, is in a secondary control stem open setting, and wherein the primary check valve comprises a primary valve body which is movable relative to the hydraulic block from its primary valve body closed setting, in which it bears against a preferably circular primary valve seat of the hydraulic block under loading by a spring force of a primary spring, directly or indirectly or with or without agency by means of the secondary control stem of the secondary check valve against the spring force of the primary spring into a primary valve body open setting in which throughflow of the drive fluid through the primary check valve is possible, and wherein in the primary valve body open setting of the primary valve body and in the secondary valve body open setting of the secondary valve body a through passage for the drive fluid is opened up so that the drive fluid can flow from the hydraulic inlet via the lock chamber to the work chamber and conversely, and wherein a free secondary control stem end, which faces the primary valve body, of the secondary control stem in the secondary valve body closed setting of the secondary valve body and in the primary valve body closed setting of the primary valve body is arranged at an axial spacing from the primary valve body.

In order to safeguard hydraulically raised loads, hydraulically unblockable check valves, ball cocks and 2/2 way seat valves, for example, have become known from practice. They serve the purpose of blocking the hydraulic fluid volumes, if possible free of leakage, so that hydraulic fluid cannot unintentionally escape from the respective pressure chamber of the cylinder. It is common to all valves and devices present in single form that they can fail in the case of contamination, oscillations (vibrations), pressure and temperature fluctuations or wear and thus not fulfil their function correctly or not fulfil it at all. Valves in a so-called redundant embodiment with two blocking devices in series have also become known from practice so as to improve functional reliability and also valves with an elastomeric seal so as to achieve freedom from leakage.

A device for holding a shaft, which is provided with a piston, of a double-acting hydraulic cylinder has become known from WO 2017/191380 A1 or the parallel US 2019/0032680 A1. This device comprises a double check valve formed from two check valve arrangements, of which each check valve arrangement is constructed from two check valves arranged in series, namely in each instance a primary valve and a secondary valve. Each of these check valves is designed in a conventional construction as a ball seat valve with a valve body ball of metal and an associated valve seat of metal, by means of which metallic sealing of the throughflow channel is achievable in the respective closed setting. Such conventional metallic seals are always susceptible to damage, particularly of the valve seat, which can lead to loss of tightness particularly over the period of use. Losses in tightness can also arise in the case of a non-optimal surface and/or shape of, in particular, the valve seat.

A device of the kind stated in the introduction or in the preamble of claim 1 has become known from WO 98/20260 A and EP 0 935 715 B1 resulting therefrom and the German translation DE 697 27 307 T2 thereof as well as from the parallel US 2019/0032680 A1. This device comprises two check valves in series, namely a primary check valve, which is designed as a conventional ball seat valve, and a second check valve (safety valve) with a closing function delayed relative to the primary check valve and with an elastomeric seal. Due to the afore-mentioned reasons, leakage can arise with such a primary check valve. This then leads to formation of a compressed oil volume in the space between the primary check valve and the secondary check valve. When the secondary check valve is controlled open so as to lower the load it is possible for formation of a decompression flow of the compressed oil volume to occur and as a consequence thereof wear and/or displacement of the elastomeric seal, which can lead to loss of function of the secondary valve.

It is an object of the invention to make available a device of the kind stated in the introduction, a method of unblocking a secondary check valve of the device and a method of blocking a secondary check valve of the device, by which a greater level of functional reliability over a longer period of use and therefore a greater degree of security in holding the shaft, particularly when under load, of the hydraulic cylinder in a desired setting are achievable.

This object is fulfilled by the independent claims. In particular, the task is fulfilled by a device with the features stated in the introduction in that the secondary check valve has a first throttle which is formed in front of the seal as considered in a first flow direction of the drive fluid from the hydraulic inlet through the lock chamber to the work chamber and which is formed by a first throttle body of the secondary control stem and by a first throttle counter-body of the hydraulic block, and that the secondary control stem and the hydraulic block are adapted to one another in such a way that the first throttle body in the secondary control stem open setting is in a first throttle body open setting in which a preferably annular, especially circular, first a throttle opening gap is formed between the first throttle body and the first throttle counter-body, and that the first throttle body in the secondary control stem closed setting of the secondary control stem is directly opposite the first throttle counter-body of the hydraulic block and is in a first throttle body closed setting in which a preferably annular, especially circular, first throttle closing gap which is very much smaller than the first throttle opening gap is formed between the first throttle body and the first throttle counter-body so that substantially no or only very little drive fluid per unit of time can pass the first throttle closing gap, and that the secondary control stem is transferrable in the axial direction from its secondary control stem closed setting into a secondary control stem intermediate setting and conversely, in which the first throttle body is in a second throttle body closed setting in which as before the preferably annular, especially circular, first throttle closing gap or a preferably annular, especially circular, second throttle closing gap which is very much smaller than the first throttle opening gap is formed between the first throttle body and the first throttle counter-body so that as before substantially no or only very little drive fluid per unit of time can pass the first throttle closing gap or the second throttle closing gap and in which the secondary valve body is lifted by its seal from the contact surface of the secondary valve seat with formation of a first throughflow gap, and that the secondary control stem is movable in the axial direction from its secondary control stem intermediate setting into its secondary control stem open setting and conversely, in which the first throttle body is in the first throttle body open setting in which the first throttle opening gap is formed between the first throttle body and the first throttle counter-body and in which the secondary valve body remains lifted by its seal from the contact surface of the secondary valve seat with formation of a second throughflow gap
and/or
that the secondary check valve has a second throttle which is formed after the seal as considered in a first flow direction of the drive fluid from the hydraulic inlet through the lock chamber to the work chamber and which is formed by a second throttle body of the secondary control stem and by a second throttle counter-body of the hydraulic block, and that the secondary control stem and the hydraulic block are adapted to one another in such a way that the second throttle body in the secondary control stem open setting is in a second throttle body open setting in which a preferably annular, especially circular, second throttle opening gap is formed between the second throttle body and the second throttle counter-body, and that the second throttle body in the secondary control stem closed setting of the secondary control stem is directly opposite the second throttle counter-body of the hydraulic block and is in a third throttle body closed setting in which a preferably annular, especially circular, third throttle closing gap which is very much smaller than the second throttle opening gap is formed between the second throttle body and the second throttle counter-body so that substantially no or only very little drive fluid per unit of time can pass the third throttle closing gap, and that the secondary control stem is transferrable in the axial direction from its secondary control stem closed setting to a secondary control stem intermediate setting and conversely, in which the second throttle body is in a fourth throttle body closed setting in which as before the preferably annular, especially circular, third throttle closing gap or a preferably annular, especially circular, fourth throttle closing gap which is likewise very much smaller than the second throttle opening gap is formed between the second throttle body and the second throttle counter-body so that as before substantially no or only very little drive fluid per unit of time can pass the third throttle closing gap or the fourth throttle closing gap, and in which the secondary valve body is lifted by its seal from the contact surface of the secondary valve seat with formation of a or the first throughflow gap and that the secondary control stem is movable in the axial direction from its secondary control stem intermediate setting into its secondary control stem open setting and conversely, in which the second throttle body is in the second throttle body open setting in which the second throttle opening gap is formed between the second throttle body and the second throttle counter-body and in which the secondary valve body remains lifted by its seal from the contact surface of the secondary valve seat with formation of a or the second throughflow gap.

Due to the fact that a first throttle is formed before the seal, as considered in first flow direction of the drive fluid from the hydraulic inlet through the lock chamber to the first work chamber, by a first throttle body of the secondary control stem and by a first throttle counter-body of the hydraulic block and that the first throttle body in the secondary control stem open setting is in a first throttle body open setting in which a preferably annular, especially circular, first throttle opening gap is formed between the first throttle body and the first throttle counter-body and that the first throttle body in the secondary control stem closed setting of the secondary control stem is in a first throttle body closed setting in which a preferably annular, especially circular, first throttle closing gap which is very much smaller than the first throttle opening gap is formed between the first throttle body and the first throttle counter-body so that substantially no or only very little drive fluid per unit of time can pass the first throttle closing gap, and that the secondary control stem is transferrable in axial direction from its secondary control stem closed setting to a secondary control stem intermediate setting and conversely, in which the first throttle body is in a second throttle body closed setting in which as before the preferably annular, especially circular, first throttle closing gap or a preferably annular, especially circular, second throttle closing gap which is likewise very much smaller than the first throttle opening gap is formed between the first throttle body and the first throttle closing gap so that as before substantially no or only very little drive fluid per unit of time can pass the first throttle closing gap or the second throttle closing gap, and in which the secondary valve body is lifted by its seal from the contact surface of the secondary valve seat with formation of a first throughflow gap, and that the secondary control stem is movable in axial direction from its secondary control stem intermediate setting into its secondary control stem open setting and conversely, in which the first throttle body is in the first throttle body open setting in which the first throttle opening gap is formed between the first throttle body and the first throttle counter-body and in which the secondary valve body remains lifted by its seal from the contact surface of the secondary valve seat with formation of a second throughflow gap, a compressed drive fluid, which in the secondary control stem closed setting of the secondary control stem is possibly present in the second opening behind—as considered in the first flow direction of the drive fluid from the hydraulic inlet through the lock chamber to the first work chamber—the seal bearing tightly against the contact surface of the secondary valve seat, can when the secondary check valve is opened flow away under formation of a decompression flow in a second flow direction opposite to the first flow direction through the second throughflow gap, which is formed between the seal and the contact surface of the secondary valve seat, without damage (wear) and/or displacement of the seal. Further, on closing of the secondary check valve it can be achieved that firstly the first throttle opening gap is closed, thus only the first throttle closing gap is formed, before the seal comes into engagement, thus bears against the contact surface of the secondary valve seat of the hydraulic block, so that damage (wear) and/or displacement of seal, particularly due to a dynamic pressure flow, can be prevented.

Due to the fact that a second throttle is formed after the seal, as considered in the first flow direction of the drive fluid from the hydraulic inlet through the lock chamber to the first work chamber, by a second throttle body of the secondary control stem and by a second throttle counter-body of the hydraulic block and that the second throttle body in the secondary control stem open setting is in a second throttle body open setting in which a preferably annular, especially circular, second throttle opening gap is formed between the second throttle body and the second throttle counter-body and that the second throttle body in the secondary control stem closed setting of the secondary control stem is in a third throttle body closed setting in which a preferably annular, especially circular, third throttle closing gap which is very much smaller than the second throttle opening gap is formed between the second throttle body and the second throttle counter-body so that substantially no or only very little drive fluid per unit of time can pass the third throttle closing gap, and that the secondary control stem is transferrable in the axial direction from its secondary control stem closed setting to a secondary control stem intermediate setting and conversely, in which the second throttle body is in a fourth throttle body closed setting in which as before the preferably annular, especially circular, third throttle closing gap or a preferably annular, especially circular, fourth throttle closing gap which is likewise very much smaller than the second throttle opening gap is formed between the second throttle body and the second throttle counter-body so that as before substantially no or only very little drive fluid per unit of time can pass the third throttle closing gap or the fourth throttle closing gap, and in which the secondary valve body is lifted by its seal from the contact surface of the secondary valve seat with formation of a or the throughflow gap and that the secondary control stem is movable in the axial direction from its secondary control stem intermediate setting into its secondary control stem open setting and conversely, in which the second throttle body is in the second throttle body open setting in which the second throttle opening gap is formed between the second throttle body and the second throttle counter-body and in which the secondary valve body remains lifted by its seal from the contact surface of the secondary valve seat with formation of a or the second throughflow gap, a compressed drive fluid, which in the secondary control stem closed setting of the secondary control stem is possibly present in the second opening behind the second throttle body as considered in the first flow direction of the drive fluid from the hydraulic inlet through the lock chamber to the first work chamber, can when the secondary check valve is opened flow away under formation of a decompression flow in a or the second flow direction opposite to the first flow direction through the second throttle opening gap formed between the second throttle body and the second throttle counter-body of the hydraulic block and through the second throughflow gap formed between the seal and the contact surface of the secondary valve seat, without damage (wear) and/or displacement of the seal. Further, on closing of the secondary check valve it can be achieved that firstly the second throttle opening gap is closed, thus the third throttle closing gap or the fourth throttle closing gap is formed, before the seal comes into engagement, thus bears against the contact surface of the secondary valve seat of the hydraulic block, so that damage (wear) and/or displacement of the seal, particularly due to a dynamic pressure flow, can be prevented.

According to a particularly preferred variant of embodiment it can be provided that the first throttle closing gap and/or the third throttle closing gap is or are each at most 0.1 millimetres or at most 0.05 millimetres or at most 0.03 millimetres. It can thereby be ensured to a particular degree that substantially no or only very little drive fluid per unit of time can pass the first throttle closing gap and/or the third throttle closing gap, so that it is possible to particularly effectively avoid or prevent a possible decompression flow and/or dynamic pressure flow being able to lead to damage (wear) and/or displacement of the seal, as a result of which functional reliability can be improved to a particular degree.

Insofar as the second throttle closing gap and/or the fourth throttle closing gap is or are formed, according to an advantageous development this or these can likewise each be at most 0.1 millimetres or at most 0.05 millimetres or at most 0.03 millimetres. This leads to a further improvement in the sense of the foregoing advantages.

According to an advantageous embodiment it can be provided that the first throttle body has a cylindrical first throttle surface and the first throttle counter-body has a cylindrical first throttle counter-surface, which extend in the axial direction and which lie directly opposite—preferably radially and/or with formation of a fit tolerance—in the secondary control stem closed setting of the secondary control stem and/or in the secondary control stem intermediate setting of the secondary control stem and/or that the second throttle body has a cylindrical second throttle surface and the second throttle counter-body has a cylindrical second throttle counter-surface, which extend in the axial direction and are directly opposite—preferably radially and/or with formation of a fit tolerance—in the secondary control stem closed setting of the secondary control stem. A better throttle effect and better guidance conditions can be achieved so that functional reliability can be further improved.

According to an advantageous development it can be provided that the first throttle surface of the first throttle body extends parallel to a or the secondary control stem longitudinal axis of the secondary control stem and at least in the secondary control stem closed setting extends parallel to the first throttle counter-surface of the hydraulic block and/or that the second throttle surface of the second throttle body extends parallel to a or the secondary control stem longitudinal axis of the secondary control stem and at least in the secondary control stem closed setting extends parallel to the second throttle counter-surface of the hydraulic block and/or that the first throttle surface of the first throttle body and the second throttle surface of the second throttle body extend parallel to one another and that the first throttle counter-surface of the first throttle counter-body and the second throttle counter-surface of the second throttle counter-body extend parallel to one another. A further improvement in the sense of the foregoing advantages can thereby be achieved.

According to a preferred embodiment it can be provided that the secondary valve body comprises a rigid secondary valve body part, preferably of metal, which has a conical, concave, spherical or part-spherical secondary valve body contact surface, which widens outwardly, preferably radially, in the first flow direction and is preferably arranged after the seal as considered in the first flow direction and by which the rigid secondary valve body part of the secondary valve body in the secondary valve body closed setting bears against a preferably annular, especially circular, secondary shoulder, which preferably consists of metal, of the hydraulic block. Sealing in the secondary valve body closed setting and functional reliability of the device can thereby be further improved.

The sealing and guidance conditions can be further improved if the secondary valve body contact surface of the secondary valve body part is arranged, as considered in the first flow direction, before the second throttle body and/or between the seal and the second throttle body and/or between the first throttle body and the second throttle body. The functional reliability of the device can thereby be further improved.

The functional reliability of the device can be further improved to a particular degree if the seal is a sealing ring, which is received in a preferably radial, outwardly open, preferably annular, especially circular, groove of the secondary control stem.

According to a first form of embodiment the sealing ring can be an O-ring. The sealing ring can thus have a circular cross-section. Such an O-ring is producible particularly simply and economically in large piece numbers, especially by injection moulding.

According to an advantageous embodiment it can be provided that the O-ring bears, preferably under bias, against a concave groove base or concavely rounded—preferably by an arc—groove base of the groove of the secondary control stem. Consequently, when the valve is opened a greater degree of security against movement or flushing of the O-ring out of the groove due to a flow of the work fluid acting on the O-ring can thereby be achieved.

According to a particularly preferred variant of embodiment it can be provided that the sealing ring has a cylindrical or circularly cylindrical sealing ring inner surface by way of which it bears, preferably under bias, against a cylindrical or circularly cylindrical groove base of the groove. In that case, according to a preferred design it can be provided that the seal has a maximum sealing ring width as considered in the axial direction and that the cylindrical sealing ring inner surface as considered in the axial direction extends over an axial length corresponding with at least a third of the maximum sealing ring width or with at least half of the maximum sealing ring width or with at least two-thirds of the maximum sealing ring width and/or with the maximum sealing ring width. Through these measures, particularly if the sealing ring bears over its entire sealing ring width or over the entire axial length of its cylindrical sealing ring inner surface against the cylindrical groove base of the groove or against the inner diameter of the groove, it is possible to prevent a fluid pressure or fluid flow passing under the sealing ring. It is thereby possible to reliably and permanently prevent the sealing ring from being flushed out of the groove by the work fluid and, in particular, even at elevated pressures of, for example, 350 bars and at elevated temperatures of, for example, 60 degrees or more.

According to a development it can be provided that the sealing ring has on its first sealing ring side facing the secondary valve body contact surface a planar first sealing ring contact surface, which is preferably formed perpendicularly to the sealing ring inner surface and by which the sealing ring is supportable or supported on a planar first side surface, which is opposite the first sealing ring contact surface and which preferably extends perpendicularly to a or the secondary control stem axial axis of the secondary control stem, of the groove. Alternatively or additionally it can be provided that the sealing ring has on its second sealing ring side, which faces the first throttle body, and/or on its second sealing ring side, which is remote from the second throttle body, a planar second sealing ring contact surface which is preferably formed perpendicularly to the sealing ring inner surface and by which the sealing ring is supportable or supported on a planar second side surface, which is opposite the second sealing ring contact surface and which extends preferably perpendicularly to a or the secondary control stem axial axis of the secondary control stem, of the groove. A further improvement in the sense of the foregoing advantages can thereby be achieved.

According to a development it can be provided that the groove has a groove width particularly between the first sealing ring contact surface and the second sealing ring contact surface as considered in the axial direction and that the sealing ring is received in the groove by a sealing ring part which as considered in the axial direction has a maximum sealing-ring-part width smaller than the groove width of the groove receiving the sealing ring part. It can thereby be ensured that the pressure of the work fluid can act particularly advantageously on the sealing ring in the axial direction, whereby a further improvement in the sealing effect can be achieved.

According to a preferred embodiment it can be provided that the sealing ring has a sealing ring part which is associated with the secondary valve seat and extends outwardly, preferably radially, from the sealing ring inner surface and which as considered in the axial direction conically tapers towards the secondary valve body and/or as considered in the axial direction conically tapers away from the secondary valve body. As a result, an elastic deformation or an elastic compression of the sealing ring when it bears against the contact surface of the valve seat can be increased or improved so that better sealing is achievable thereat. Such a sealing ring can be produced particularly economically by material removal, particularly by turning. This can mean, in particular, advantages in cost if the sealing ring is to be produced in comparatively small piece numbers.

According to a development it can be provided that the sealing ring or the sealing ring part has a trapezium-shaped cross-section as considered in an axial cross-section preferably containing a or the secondary control stem axial axis of the secondary control stem. A further improvement in the sense of the foregoing advantages can thereby be achieved.

Alternatively or additionally it can be provided that the sealing ring or the sealing ring part is constructed symmetrically with respect to a sealing ring centre plane extending perpendicularly to the secondary control stem axial axis of the secondary control stem. Mistake-free mounting of the sealing ring with always sufficiently large resilient restoring forces when in contact with the contact surface of the secondary valve seat is thereby possible.

According to an advantageous development it can be provided that the seal in the unloaded state extends, preferably radially, out beyond the first throttle surface of the first throttle body. A further improvement in the sense of the foregoing advantages can thus be achieved.

Particularly advantageous sealing conditions over a lengthy period of use can be achieved if the contact surface, which is associated with the seal, of the secondary valve seat is formed to widen, preferably radially, outwardly as considered in the first flow direction and/or if the contact surface, which is associated with the seal, of the secondary valve seat is formed to be conical, convex, spherical or part-spherical.

According to a particularly preferred variant of embodiment it can be provided that the secondary control stem has a preferably central secondary guide stem which as considered in the direction of its secondary guide stem axial axis or longitudinal axis extends in the direction of its secondary guide stem axial axis or longitudinal axis between the first throttle body or the second throttle body on the one hand and the free secondary control stem end of the secondary control stem on the other hand and which is movably guided in a secondary guide stem receiver of the hydraulic block with a small amount of play in the direction of its secondary guide stem longitudinal axis (in the axial direction). As a result, even better guidance of the secondary control stem of the secondary check valve in conjunction with further improved functional reliability of the device over a longer period of use can be achieved.

According to a particularly preferred embodiment it can be provided that the primary check valve has a primary guide stem, which extends in the direction of its primary guide stem axial axis or longitudinal axis and is provided with the primary valve body and which is movably guided in a primary guide stem receiver of the hydraulic block with a small amount of play in the direction of its primary guide stem axial axis (in the axial direction). As a result, improved sealing conditions in conjunction with further improved functional reliability of the device over a longer period of use can be achieved.

According to an advantageous embodiment it can be provided that the primary valve body has a preferably rigid primary valve body part, preferably of metal, which has a conical, concave, spherical or part-spherical primary valve body contact surface, which widens, preferably radially, outwardly as considered in the first flow direction and by which the rigid primary valve body part of the primary valve body in the primary valve body closed setting bears against a preferably annular, especially circular, preferably rigid, primary shoulder of the hydraulic block. Sealing in the primary valve body closed setting and functional reliability of the device can thereby be further improved.

The invention also relates to a method of unblocking or opening the secondary check valve of the device according to the invention, wherein starting from the secondary valve body closed setting, in which the secondary control stem is in its secondary control stem closed setting and in which the first throttle body of the secondary control stem is in its first throttle body closed setting and the secondary valve body tightly bears by its seal against the contact surface of the secondary valve seat of the hydraulic block so that the secondary check valve is blocked against throughflow of the drive fluid, the secondary control stem is transferred in the axial direction in a secondary control stem opening direction to its secondary control stem intermediate setting in which the first throttle body is in its second throttle body closed setting in which as before the first throttle closing gap or the second throttle closing gap is formed between the first throttle body and the first throttle counter-body so that as before substantially no or only very little drive fluid per unit of time can pass the first throttle gap or the second throttle gap and in which the secondary valve body is lifted by its seal from the contact surface of the secondary valve seat of the hydraulic block with formation of a first throughflow gap, whereupon the secondary control stem is further transferred in the secondary control stem opening direction to its secondary control stem open setting in which the first throttle body is in its first throttle body open setting in which the first throttle opening gap is formed between the first throttle body and the first throttle counter-body and in which the secondary valve body remains lifted by its seal from the contact surface of the secondary valve seat of the hydraulic block under formation of a second throughflow gap and/or starting from the secondary valve body closed setting in which the secondary control stem is in its secondary control stem closed setting and the second throttle body of the secondary control stem is in its third throttle body closed setting and in which the secondary valve body tightly bears by its seal against the contact surface of the secondary valve seat of the hydraulic block so that the secondary check valve is blocked against throughflow of the drive fluid, the secondary control stem is transferred in the axial direction in a or the secondary control stem opening direction to the secondary control stem intermediate setting in which the second throttle body is in its fourth throttle body closed setting in which as before the third throttle closing gap or the fourth throttle closing gap is formed between the second throttle body and the second throttle counter-body so that as before substantially no or only very little drive fluid per unit of time can pass the third throttle gap or the fourth throttle gap and in which the secondary valve body is lifted by its seal from the contact surface of the secondary valve seat of the hydraulic block under formation of a or the throughflow gap, whereupon the secondary control stem is further transferred in the secondary control stem opening direction to its secondary control stem open setting in which the second throttle body is in its second throttle body open setting in which the second throttle opening gap is formed between the second throttle body and the second throttle counter-body and in which the secondary valve body remains lifted by its seal from the contact surface of the secondary valve seat of the hydraulic block with formation of a or the second throughflow gap.

In that case, according to an advantageous variant of the method it can be provided that during transfer of the secondary control stem in the secondary control stem opening direction from its secondary control stem intermediate setting to its secondary control stem open setting initially only the second throttle or only the second throttle closing gap, but still not the first throttle or first throttle closing gap, is opened, for which purpose initially the second throttle body is transferred in the secondary control stem opening direction from its second throttle body closed setting to its second throttle body open setting or to a third throttle body open setting in which the second throttle opening gap or a third throttle opening gap which is larger, preferably very much larger, than the third throttle closing gap or the fourth throttle closing gap is formed between the second throttle body and the second throttle counter-body and the first throttle or the first throttle opening gap is opened only subsequently, for which purpose the first throttle body is further transferred in the secondary control stem opening direction to its first throttle body open setting in which the first throttle opening gap is formed between the first throttle body and the first throttle counter-body. An even greater functional reliability of the device over a longer time period can thereby be achieved.

The invention also relates to a method of blocking or closing the secondary check valve of the device according to the invention, wherein the secondary control stem is transferred in the axial direction in a secondary control stem closing direction from its secondary control stem open setting, in which the first throttle body is in the first throttle body open setting in which the first throttle opening gap is formed between the first throttle body and the first throttle counter-body and in which the secondary valve body is lifted by its seal from the contact surface of the secondary valve seat with formation of the second throughflow gap, to its secondary control stem intermediate setting in which the first the first throttle body is in the second throttle body closed setting in which the first throttle closing gap or the second throttle closing gap is formed between the first throttle body and the first throttle counter-body so that substantially no or only very little drive fluid per unit of time can pass the first throttle closing gap or the second throttle closing gap and in which the secondary valve body remains lifted by its seal from the contact surface of the secondary valve seat of the hydraulic block with formation of the first throughflow gap, whereupon the secondary control stem is further transferred in the secondary control stem closing direction to its secondary control stem closed setting in which the first throttle body of the secondary control stem is in its first throttle body closed setting in which as before the first throttle closing gap is formed between the first throttle body and the first throttle counter-body so that no or substantially only very little drive fluid per unit of time can pass the first throttle closing gap and in which the secondary valve body tightly bears by its seal against the contact surface of the secondary valve seat of the hydraulic block so that the secondary check valve is blocked against throughflow of the drive fluid
and/or
the secondary control stem is transferred in the axial direction in a or the secondary control stem closing direction from its secondary control stem open setting, in which the second throttle body is in the second throttle body open setting in which the second throttle opening gap is formed between the second throttle body and the second throttle counter-body and in which the secondary valve body is lifted by its seal from the contact surface of the secondary valve seat with formation of the second throughflow gap, to its secondary control stem intermediate setting in which the second throttle body is in the fourth throttle body closed setting in which the third throttle closing gap or the fourth throttle closing gap is formed between the second throttle body and the second throttle counter-body so that no or substantially only very little drive fluid per unit of time can pass the third throttle closing gap or the fourth throttle closing gap and in which the secondary valve body remains lifted by its seal from the contact surface of the secondary valve seat of the hydraulic block with formation of the first throughflow gap, whereupon the secondary control stem is further transferred in the secondary control stem closing direction to its secondary control stem closed setting, in which the second throttle body of the secondary control stem is in its second throttle body closed setting in which (as before) the third throttle closing gap is formed between the second throttle body and the second throttle counter-body so that no or substantially only very little drive fluid per unit of time can pass the third throttle closing gap and in which the secondary valve body tightly bears by its seal against the contact surface of the secondary valve seat of the hydraulic block so that the secondary check valve is blocked against throughflow of the drive fluid.

In that case, according to an advantageous variant of the method it can be provided that during transfer of the secondary control stem in the secondary control stem closing direction from its secondary control stem open setting to its secondary control stem intermediate setting initially the first throttle or the first throttle closing gap, but still not the second throttle or the second throttle closing gap, is closed, for which purpose initially (only) the first throttle body is transferred in the secondary control stem closing direction from its first throttle body open setting to its second throttle body closed setting (or to a fifth throttle body closed setting) in which the first throttle closing gap or the second throttle closing gap is formed between the first throttle body and the first throttle counter-body and the second throttle or second throttle closing gap is closed only subsequently, for which purpose the second throttle body is further transferred in the secondary control stem closing direction to its fourth throttle body closed setting in which the third throttle closing gap or the fourth throttle closing gap is formed between the second throttle body and the second throttle counter-body. Even greater functional reliability of the device over a longer time period can thereby be achieved.

It will be understood that the foregoing features and measures can be combined as desired within the scope of feasibility of the invention. Further advantages, features and aspects of the invention are evident from the claims and from the following description part, in which preferred examples of embodiment of the invention are described in more detail on the basis of the drawings, in which:

FIG. 10 shows a three-dimensional view of a second example of embodiment of a sealing ring;

Figure 3:
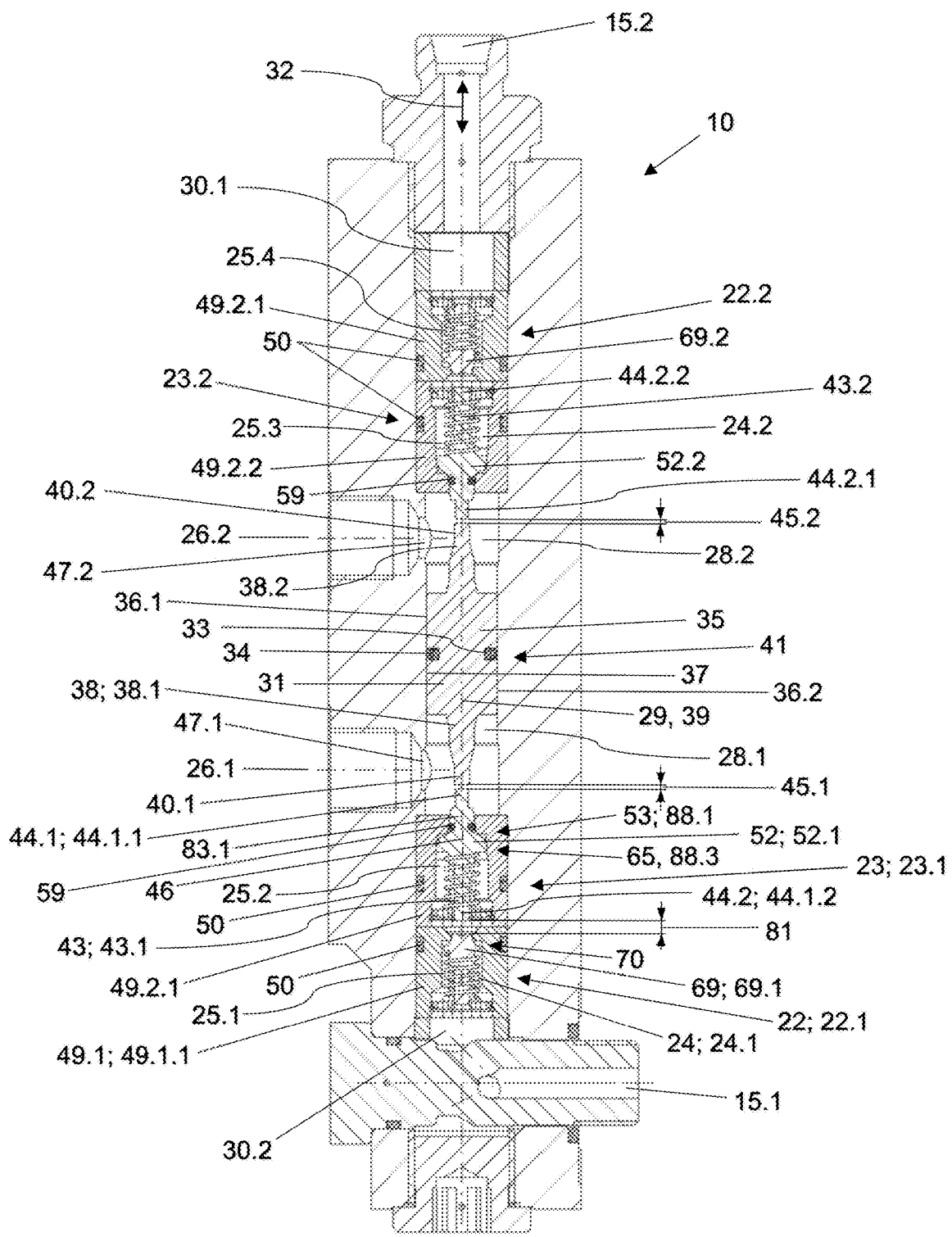
FIG. 3 shows a longitudinal section of a hydraulic block of the device, with a double check valve consisting of two check valve arrangements, of which each check valve arrangement comprises a primary check valve and a secondary check valve, wherein each check valve is closed.
Figure 7:
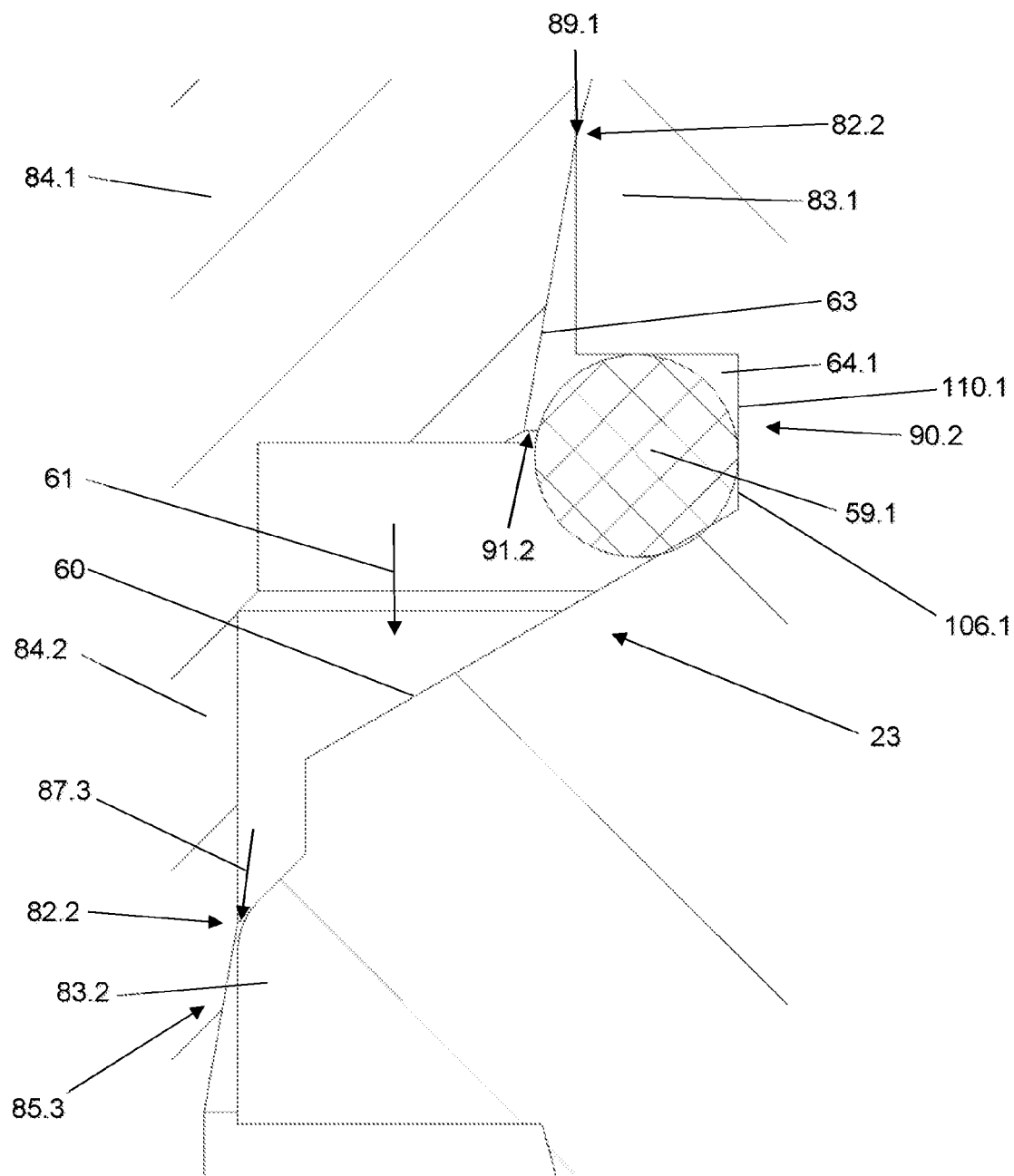
FIG. 7 shows a substantially enlarged detail of the longitudinal section according to FIG. 6 in the region of the secondary check valve, wherein by contrast thereto the secondary control stem is now further displaced in its secondary control stem opening direction into a second secondary control stem intermediate setting.
Figure 12:
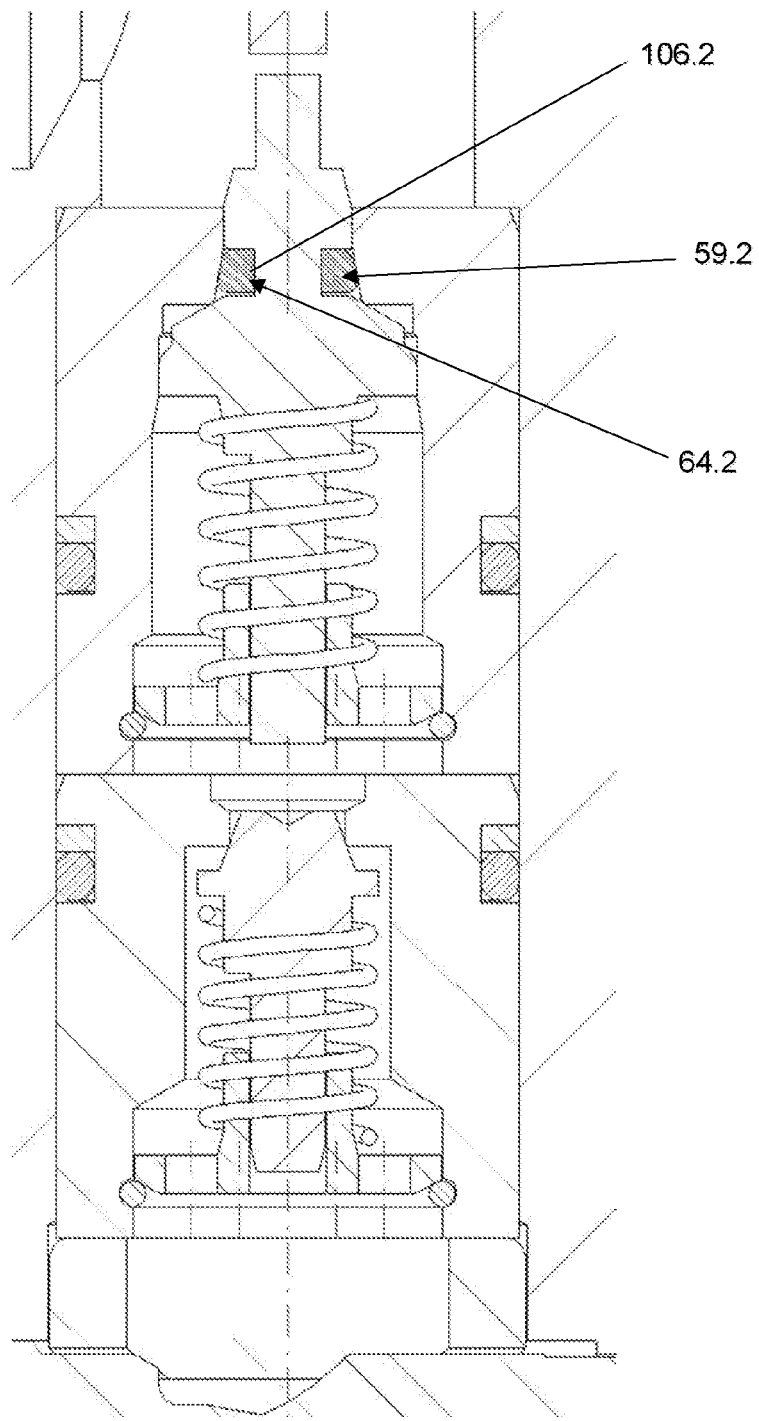
Figure 13:
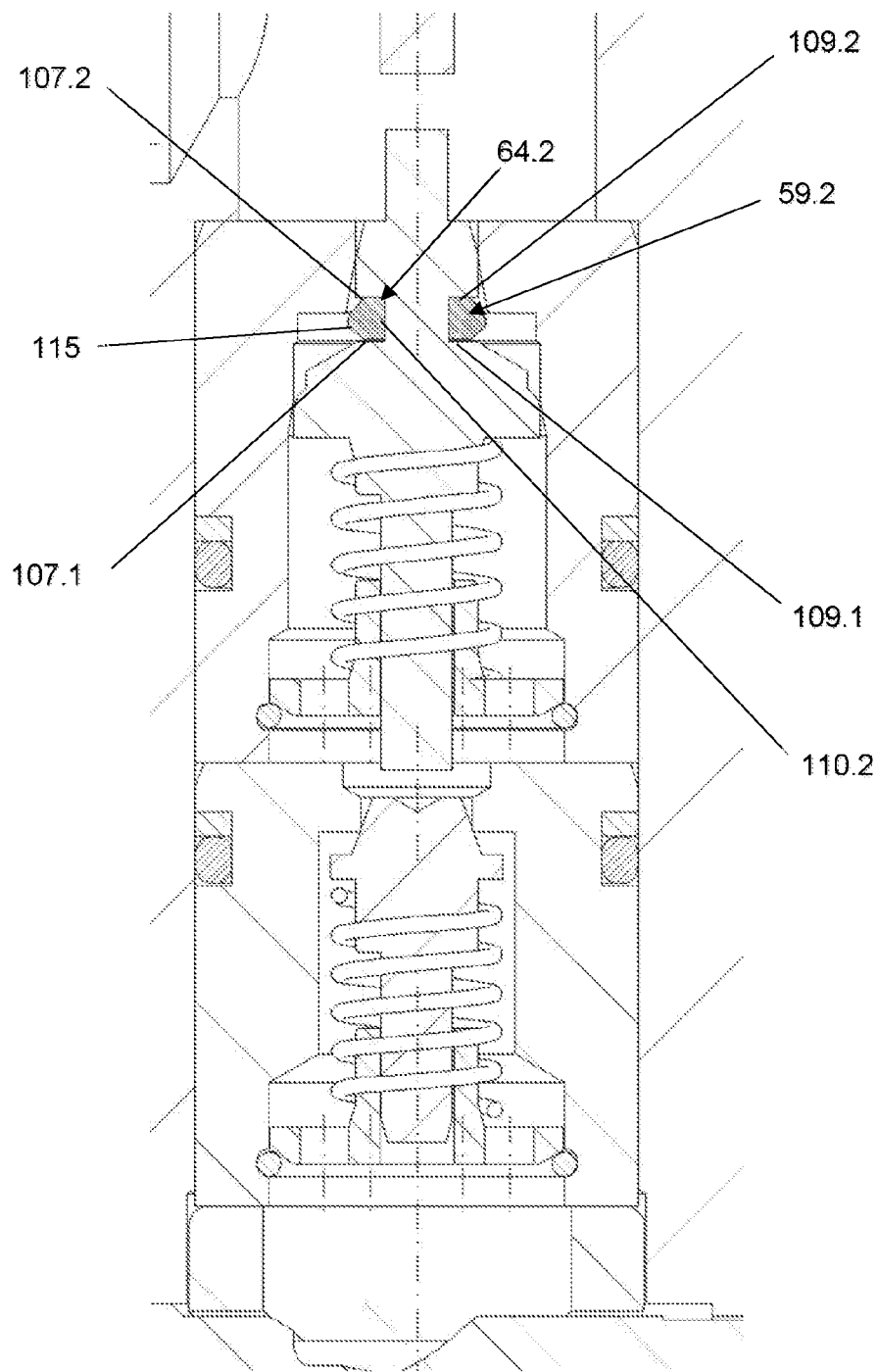

FIG. 11.1 shows a cross-section of the sealing ring according to FIG. 10;

FIG. 11.2 shows a two-dimensional illustration of the sealing ring according to FIG. 10 in a side view from the left;

FIG. 12 shows a detail of the longitudinal section of the hydraulic block shown in FIG. 3, wherein instead of the O-ring the sealing ring according to FIG. 10 is here used; and FIG. 13 shows a substantially enlarged detail of the longitudinal section according to FIG. 7, wherein instead of the O-ring the sealing ring according to FIG. 10 is here used.

The device 10 for holding a shaft 12, which is provided with a piston 11, of a hydraulic cylinder 13 in setting is represented in the form of a separating arrangement 14. The separating arrangement 14 is arranged between a first supply branch 15.1 and a second supply branch 15.2 for a drive fluid of a first work chamber 17 and a second work chamber 18, respectively. The drive fluid can preferably be hydraulic oil. The second work chamber 18 is separated from the first work chamber 17 by the piston 11. The shaft 12 is displaceable together with the piston 11 along the hydraulic cylinder 13. The separating arrangement 14 comprises a hydraulic block 19 with a double check valve 20 consisting of two check valve arrangements 21; 21.1, 21.2. Each check valve arrangement 21; 21.1, 21.2 comprises a primary check valve 22; 22.1, 22.2 and a secondary check valve 23; 23.1, 23.2, which can also be termed safety check valve. Each check valve arrangement 21; 21.2, 21.2 can also be termed a check valve, which comprises a primary check valve 22; 22.1, 22.2 and a secondary check valve 23; 23.1, 23.2. In the illustrated example of embodiment the device 10 serves for holding the shaft 12, which is provided with the piston 11, of a double-acting hydraulic cylinder in setting, which thus can be acted on by a load in both tension and compression in opposite load directions.

The hydraulic block 19 includes two lock chambers 24; 24.1, 24.2. A first check valve arrangement 21.1 of the two check valve arrangements 21, 21.2 is formed in the first lock chamber 24; 24.1. A second check valve arrangement 21.2 of the two check valve arrangements 21.2, 21.2 is formed in the second lock chamber 24.2.

The first lock chamber 24.1 has a first opening 25.1 which is provided with the first primary check valve 22.1 of the first check valve arrangement 21.1 and is in hydraulic connection with the first work chamber 17. The first lock chamber 24.2 also has a second opening 25.2 which is provided with the first secondary check valve 23.1 of the first check valve arrangement 21.1. The second opening 25.2 is in blockable hydraulic connection with the first opening 25.1. The second opening 25.2 is in blockable hydraulic connection with a first hydraulic inlet 26; 26.1 for supply of the first work chamber 17 with the drive fluid.

The second lock chamber 24.2 has a third opening 25.3 which is provided with the second primary check valve 22.2 of the second check valve arrangement 21.2 and is in hydraulic connection with the second work chamber 18. The second lock chamber 24.2 also has a fourth opening 25.4 which is provided with the second secondary check valve 23.2 of the second check valve arrangement 21.2. The fourth opening 25.4 is in blockable hydraulic connection with the third opening 25.3. The fourth opening 25.4 is in blockable hydraulic connection with a second hydraulic inlet 26; 26.2 for supply of the second work chamber 18 with the drive fluid.

The first primary check valve 21.1 and the first secondary check valve 23.1 are connected in series or arranged in a specific flow direction one behind the other in a first hydraulic supply circuit of the first work chamber 17. The second primary check valve 21.2 and the second secondary check valve 23.2 are arranged serially, thus in series, or one behind the other in flow direction in a second hydraulic supply circuit of the second work chamber 18.

The two lock chambers 24; 24.1, 24.2 are hydraulically connected by a connecting chamber 28. The connecting chamber extends in the direction of its connecting chamber longitudinal axis 29. This coincides with the lock chamber longitudinal axes 30.1, 30.2 of the two lock chambers 24.1, 24.2. A control piston 31 is received in the connecting chamber 28 and is borne to be displaceable in an axial direction 32 longitudinally of the connecting chamber 28 with a small radial play. The control piston 31 serves as unblocking means for selectable unblocking or opening either directly of the first secondary check valve 23.1 and indirectly of the first primary check valve 22.1 of the first check valve arrangement 21.1 (shown in the left in FIG. 3) or directly of the second secondary check valve 23.2 and indirectly of the primary check valve 22.2 of the second check valve arrangement 21.2 (shown on the right in FIG. 3). The control piston 31 has in its longitudinal centre an encircling, radially outwardly open circularly annular groove 33 in which an elastomeric control-piston seal 34 is received. The control piston has a control-piston guide part 35 which has circularly cylindrical guide surfaces 36.1, 36.2 on either side of the control piston seal 34. A circularly cylindrical counter-guide-surface 37 of the connecting chamber 28 is directly opposite these surfaces 36.1, 36.2 with a small radial play. The connecting chamber 28 is separated by the control piston 31 into a first connecting space chamber 28.1 and a second connecting space chamber 28.2. The control piston 31 has a first control piston control stem 38; 38.1 and a second control piston control stem 38.2, which extend in the direction of the control piston longitudinal axis 39 or in the axial direction 32 away from one another in opposite directions. The first control piston control stem 38.1, which is associated with the first secondary check valve 23.1 of the first check valve arrangement 21.1, has a first free control piston control stem end 40.1 and the second control piston control stem 38.2, which is associated with the second secondary check valve 23.2 of the second check valve arrangement 21.2, has a second free control piston control stem end 40.2. In the neutral setting 41, which is shown in FIG. 3, of the control piston 31 the first free control piston control stem end 40.1 of the first control piston control stem 38.1 is opposite a first free first secondary control stem end 44.1; 44.1.1 of a first secondary control stem 43; 43.1 of the first secondary check valve 23; 23.1 of the first check valve arrangement 21; 21.1 at a first axial spacing 45; 45.1 and the second free control piston control stem end 40.2 of the second control piston control stem 38.2 of the control piston 31 is opposite a first free second secondary control stem end 44.2, 44.2.1 of a second secondary control stem 43.2 of the second secondary check valve 23.2 of the second check valve arrangement 21.2 at a second axial spacing 45.2 which is preferably the same size as the first axial spacing 45; 45.1.

The first control piston control stem 38.1 extends axially in the first connecting space chamber 28.1 of the connecting chamber 28 and the second control piston control stem 38.2 extends in opposite direction axially in the second connecting space chamber 28.2 of the connecting chamber 28. In the closed settings, which are shown in FIG. 3, of the valve bodies 52; 52.1, 52.2; 69, 69.1, 69.2 of the check valves 22.1, 22.2; 23.1, 23.2 the first secondary control stem 43.1 of the first secondary check valve 23.1 extends by its first free secondary control stem end 44.1.1 in the first connecting space chamber 28.1 and the second secondary control stem 43.2 of the second secondary check valve 23.2 extends by its first free secondary control stem end 44.2.1 in the second connecting space chamber 28.2.

The first hydraulic inlet 26.1 opens by a first hydraulic inlet channel 47; 47.1 into the first connecting space chamber 28.1 and the second hydraulic inlet 26.2 opens by a second hydraulic inlet channel 47.2 into the second connecting space chamber 28.2. The first hydraulic inlet channel 47.1 and the second hydraulic inlet channel 47.2 extend transversely or perpendicularly to the axial direction 32 or transversely or perpendicularly to the connecting chamber longitudinal axis 29 of the connecting chamber 28.

The hydraulic block 19 has four separate insert parts 49.1; 49.1.1, 49.1.2; 49.2; 49.2.1, 49.2.2 in which the respective check valve 22.1, 22.2; 23.1, 23.2 is arranged to be displaceable in the axial direction 32 relative to the associated insert part 49.1; 49.1.1, 49.1.2; 49.2; 49.2.1, 49.2.2. Each insert part 49.1; 49.1.1, 49.1.2; 49.2; 49.2.1, 49.2.2 is designed to be rotationally symmetrical with respect to its insert part axial axis or longitudinal axis. Each insert part 49.1; 49.1.1, 49.1.2; 49.2; 49.2.1, 49.2.2 has a radially outwardly open, circularly annular groove 97, in which a toroidal seal 50 in the form of a sealing ring, which is constructed as an O-ring, of an elastomer is received. Each insert part 49.1; 49.1.1, 49.1.2; 49.2; 49.2.1, 49.2.2 is arranged with a small radial play in a cylindrical receiver 98 of the hydraulic block 19 to be releasable again. Each insert part 49.1; 49.1.1, 49.1.2; 49.2; 49.2.1, 49.2.2 is radially sealed off by means of its seal 50 relative to the associated receiver 98 of the hydraulic block 19. The first check valve arrangement 21.1 has the two insert parts 49.1.1 and 49.2.1 of the insert parts 49.1; 49.1.1, 49.1.2; 49.2; 49.2.1, 49.2.2. The insert part 49.1.1 is also termed first primary insert part. The insert part 49.1.2 is also termed first secondary insert part. The first primary insert part 49.1.1 has the first opening 25.1, in which the first primary valve body 69.1 is arranged. The first secondary insert part 49.1.2 has the second opening 25.2, in which the first secondary valve body 52.1 is arranged. The second check valve arrangement 21.2 has the two insert parts 49.2.1 and 49.2.2 of the insert parts 49.1; 49.1.1, 49.1.2; 49.2; 49.2.1, 49.2.2. The insert part 49.2.1 is also termed second primary insert part. The primary insert part 49.2.2 is also termed second secondary insert part. The second primary insert part 49.2.1 has the third opening 25.3, in which the second primary valve body 69.2 is arranged. The second secondary insert part 49.2.2 has the fourth opening 25.4, in which the second secondary valve body 52.2 is arranged.

Figure 4:
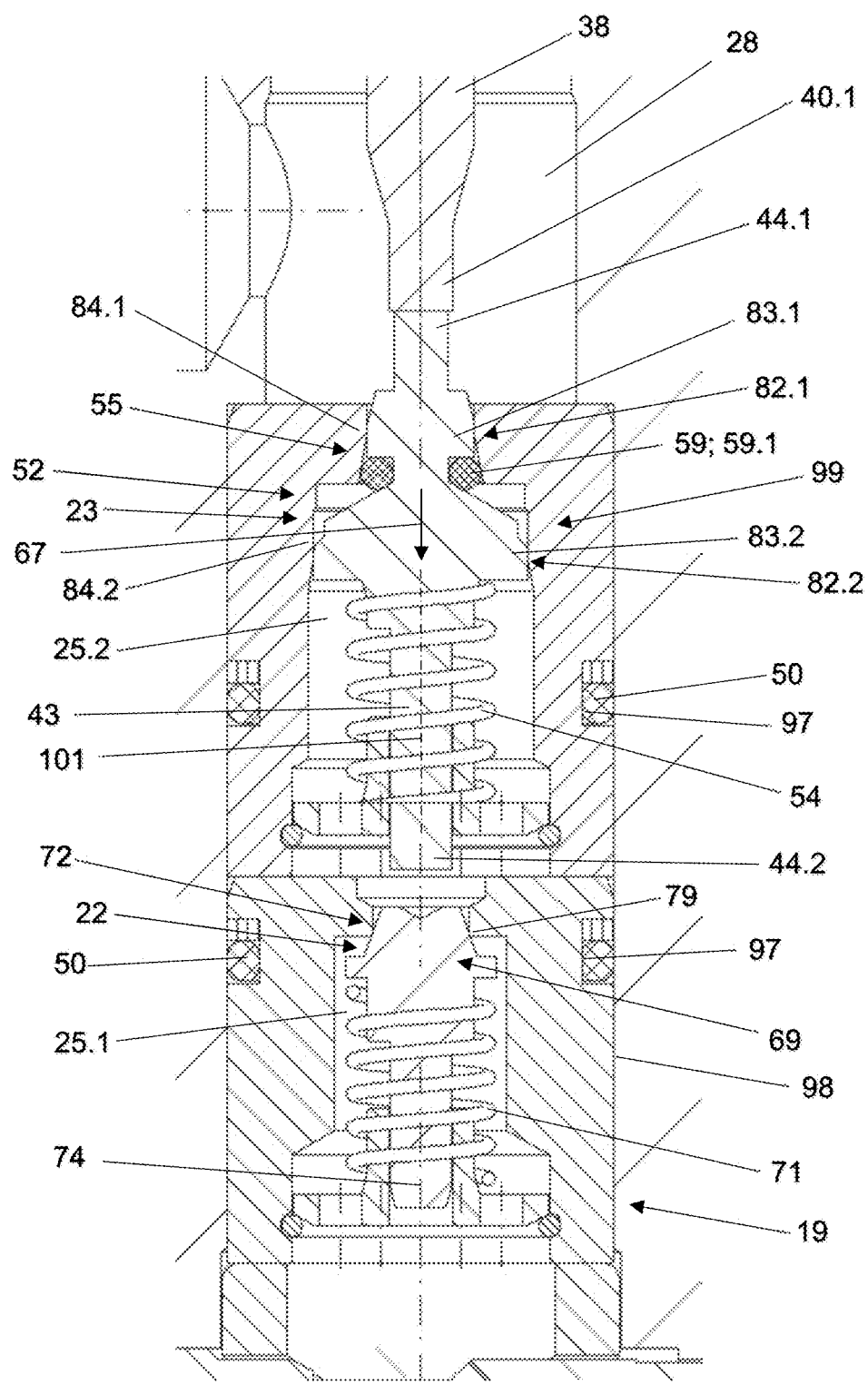
FIG. 4 shows an enlarged detail of a longitudinal section in the region of the double check valve shown on the left in FIG. 3, wherein, however, by contrast thereto the secondary control stem of the secondary check valve is displaced in a secondary control stem opening direction into a transition setting.

The two check valve arrangements 21.1, 21.2 are of the same design, but are configured to be blocking or opening in opposite flow directions of the work fluid. Accordingly, for reasons of simplification only the first check valve arrangement 21.1 illustrated on the left in FIGS. 3 and 4 is described in the following. In that case, superordinate basic reference characters are used for the same components of the two check valve arrangements 21.1, 21.2, thus, for example, the superordinate reference character 21 for the check valve arrangement. The following description applies in corresponding manner to the second check valve arrangement 21.2.

The secondary check valve arrangement 23 of the check valve arrangement 21 comprises the central secondary control stem 43, which is movable in the direction of its secondary control stem axial axis or longitudinal axis 46 in the axial direction 32 relative to the hydraulic block 19. The secondary control stem 43 can also be termed secondary valve plunger. The secondary control stem 43 has a secondary guide stem 100, which as considered in the direction of its secondary guide stem axial axis 101 extends in the direction of its secondary guide stem axial axis 101 between the second throttle body 83.2 on the one hand and the free secondary control stem end 44.2 of the secondary control stem on the other hand. The secondary guide stem 100 is guided to be movable in a secondary guide stem receiver 102 of the secondary insert part 49.2 of the hydraulic block 19 in the axial direction 32 with small play in the direction of its secondary guide stem longitudinal axis 101.

The secondary control stem 43 is designed to be rotationally symmetrical with respect to its secondary control stem axial axis or longitudinal axis 46. The secondary control stem 43 is provided with the secondary valve body 52. The secondary valve body 52 is, depending on the respective activation, movable in the axial direction 32 relative to the secondary insert part 49.2 of the hydraulic block 19 directly by means of the drive fluid or indirectly by means of the control piston 31 from its secondary valve body closed setting 53, which is shown in FIG. 3 and in which it bears against a secondary valve seat 55 of the secondary insert part 49.2 of the hydraulic block 19 under loading by a spring force of a secondary spring 62, against the spring force of the secondary spring 54 into a secondary valve body open setting 56, which is shown by way of example in FIG. 8 and in which throughflow of the drive fluid through the secondary check valve 23 is possible.

The secondary valve body 52 is provided with a rigid secondary valve body part 57 of metal and with a toroidal, resiliently compressible seal 59, preferably of an elastomer. This seal 59 can be a sealing ring 59.1 in the form of an O-ring. The sealing ring 59.1 is designed to be rotationally symmetrical with respect to its axial axis. It has an inner diameter, an outer diameter and a sealing ring thickness, which is also termed cord thickness. The sealing ring 59.1 is designed as an encircling ring, preferably of solid material, which has a circular or round cross-section. The sealing ring 59.1 is received in a radially outwardly open annular groove 64.1 of the secondary control stem 43. The groove 64.1 has a groove base 106.1, which in the illustrated example of embodiment is bounded by a circularly cylindrical groove base surface 110.1. The groove base surface 110.1 extends parallel to the secondary control stem axial axis 46. The sealing ring 59.1, which is designed as an O-ring, bears under bias against the groove base surface 110.1. This is achieved by the inner diameter of the sealing ring 59.1 being smaller than the outer diameter of the groove base surface 110.1. The sealing ring 59.1 can preferably consist of NBR (acrylnitrile butadiene rubber; also termed nitrile rubber). It can preferably have a hardness of 90 Shore A or a Shore hardness of 90 SH A. The sealing ring 59.1 can advantageously be produced by injection moulding.

The secondary valve body part 57 has a conical secondary valve body contact surface 60. The secondary valve body contact surface 60 widens radially outwardly as considered in a first flow direction 61 of the drive fluid from the first hydraulic inlet 26.1 through the lock chamber 24 to the first work chamber 17. The secondary valve body contact surface 60 is arranged after the seal 59 as considered in the first flow direction 61. In the secondary valve body closed setting 53 shown in FIG. 3 the secondary valve body part 57 of the secondary valve body 52 bears by its secondary valve body contact surface 60 against an associated circularly annular secondary shoulder 62 of the secondary valve seat 55 of the secondary insert part 49.2 of the hydraulic block 19. The secondary shoulder 62 of the secondary valve seat 55 consists of metal. In the secondary valve body closed setting 53 shown in FIG. 3 the elastomeric seal 59 tightly bears in a resiliently compressed state against an associated conical contact surface 63 of the secondary valve seat 55 of the secondary insert part 49.2 of the hydraulic block 19, so that the secondary check valve 23 is blocked against throughflow of the drive fluid. The contact surface 63, which is associated with the seal 59, of the secondary valve seat 55 widens radially outwardly as considered in the first flow direction 61.

In the secondary valve body closed setting 53 of the secondary valve body 52 the secondary control stem 43 is in a secondary control stem closed setting 65 (see FIG. 3). In the secondary valve body open setting 56 of the secondary valve body 52 the secondary control stem 43 is in a secondary control stem open setting 66 (see, for example, FIG. 8).

The primary check valve 22 comprises a primary valve body 69. The primary valve body 69 is movable relative to the primary insert part 49.1 of the hydraulic block 19 from its primary valve body closed setting 70, which is shown in FIG. 3 and in which it bears against a primary valve seat 72 of the primary insert part 49.1 of the hydraulic block 19 under loading by a spring force of a primary spring 71, by means of the secondary control stem 43 of the secondary check valve 23 against the spring force of the primary spring 71 into a primary valve body open setting 73 in which throughflow of the drive fluid through the primary check valve 22 is possible (see, for example, FIG. 9).

The primary check valve 22 comprises a primary guide stem 75, which extends in the direction of its primary guide stem axial axis or longitudinal axis 74 and which is provided with the primary valve body 69. The primary guide stem 75 is designed to be rotationally symmetrical with respect to its primary guide stem axial axis or longitudinal axis 74. The primary guide stem 75 is guided to be movable in a primary guide stem receiver 76 of the primary insert part 49.1 of the hydraulic block 19 with a small radial play in the direction of its primary guide stem longitudinal axis 74 or in the axial direction 32.

The primary valve body 69 comprises a rigid primary valve body part 77 of metal. The primary valve body 69 has a conical primary valve body contact surface 78. The primary valve body contact surface 78 widens radially outwardly as considered in the first flow direction 61. In the primary valve body closed setting 70 shown in FIG. 3 the primary valve body part 77 of the primary valve body 69 bears against a circularly annular rigid primary shoulder 79 of the hydraulic block 19. The primary shoulder 79 consists of metal.

Figure 9:
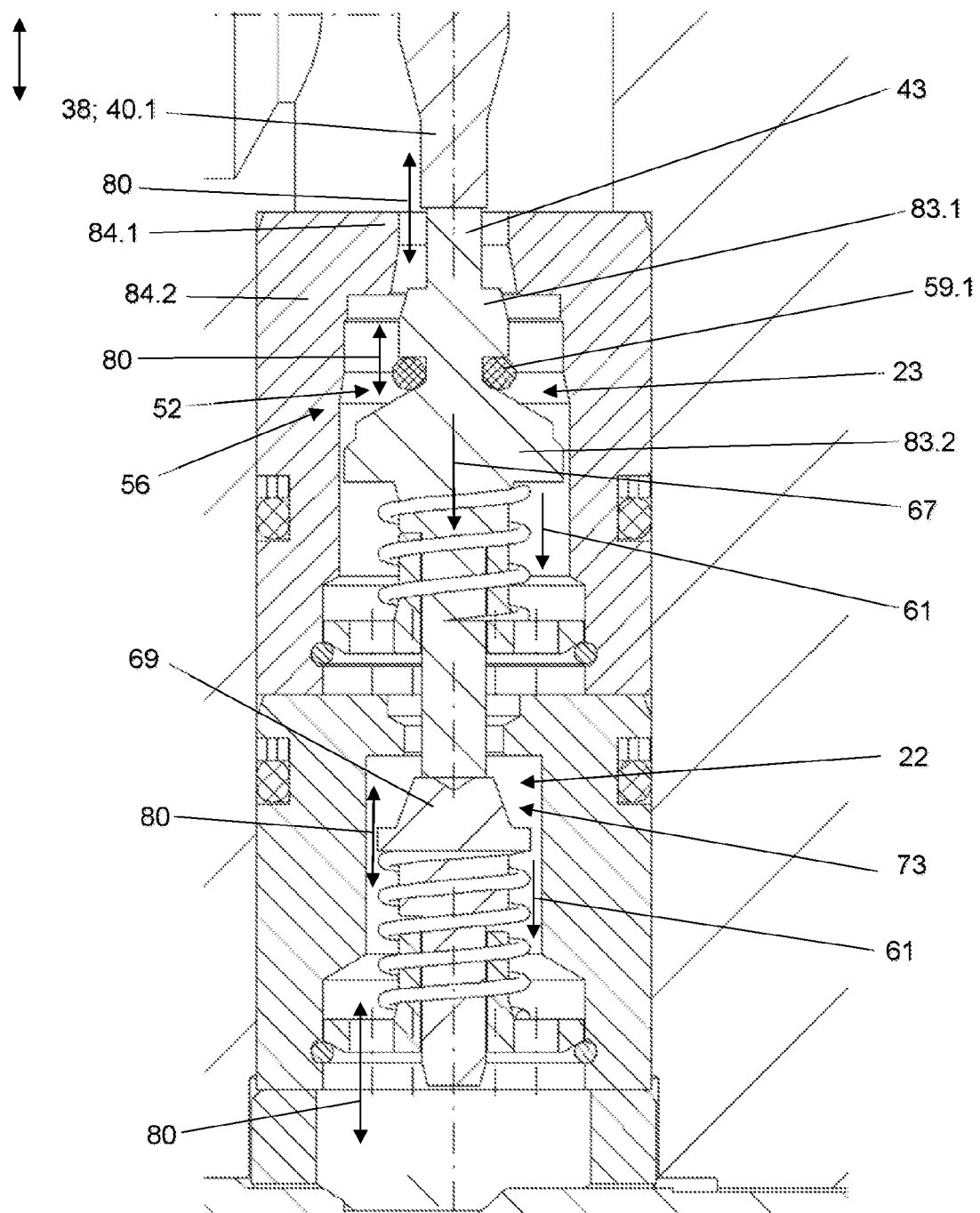
FIG. 9 shows the longitudinal section according to FIG. 8, whereby contrast thereto the secondary control stem is now further displaced in its secondary control stem opening direction by means of the control piston, whereby at the same time the primary valve body of the primary check valve is displaced into a primary valve body opening setting.

In the primary valve body open setting 73 of the primary valve body 69 of the primary check valve 22 and in the secondary valve body open setting 56 of the second secondary valve body 52 of the secondary check valve 23 a through passage 80 for the drive fluid is opened up so that the drive fluid can flow from the first hydraulic inlet 26.1 via the lock chamber 24 to the work chamber 17 and conversely (see FIG. 9).

In the secondary valve body closed setting 53 of the secondary valve body 52 and in the primary valve body closed setting 70 of the primary valve body 69 the free secondary control stem end 44.2, which faces the primary valve body 69, of the secondary control stem 43 is arranged at an axial spacing 81 from the primary valve body 69. A cavity or free space in which drive fluid can be present then exists between the second free secondary control stem end 44.2 of the secondary control stem 43 and the primary valve body 69 (see FIGS. 3, 4, 6).

The secondary check valve 23 comprises a first throttle 82.1 and a second throttle 82.2. The first throttle 82.1 is formed in front of the seal 59 as considered in the first flow direction 61. The first throttle 82.1 is formed by a first throttle body 83.1 of the secondary control stem 43 and by a first throttle counter-body 84.1 of the secondary insert part 49.2 of the hydraulic block 19. The second throttle 82.2 is formed after the seal 59 as considered in the first flow direction 61. The second throttle 82.2 is formed by a second throttle body 83.2 of the secondary control stem 43 and by a second throttle counter-body 84.2 of the secondary insert part 49.2 of the hydraulic block 19.

Figure 8:
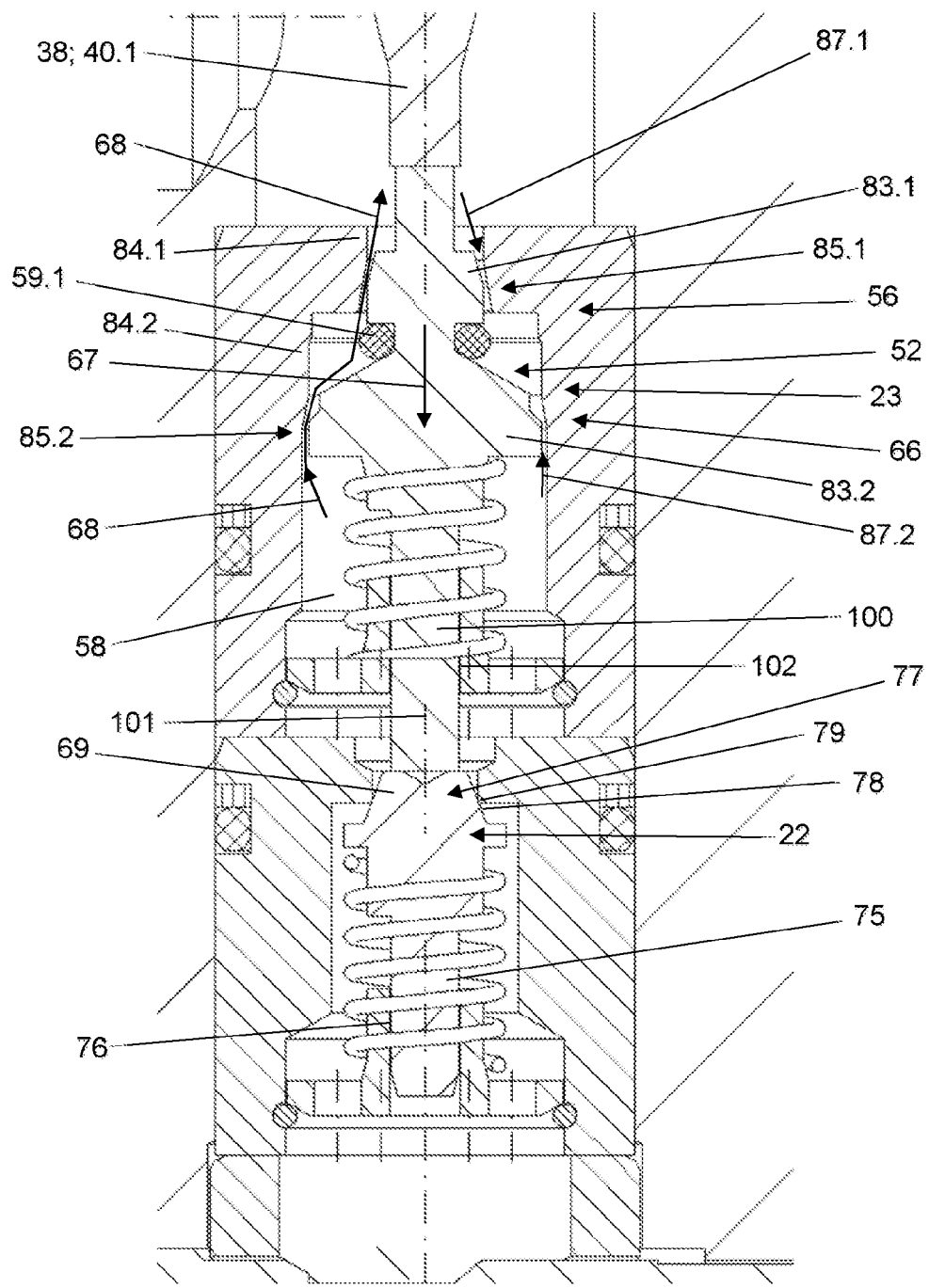
FIG. 8 shows the longitudinal section according to FIG. 6, wherein by contrast thereto the secondary control stem is now further displaced in its secondary control stem opening direction into a secondary control stem open setting.

The secondary control stem 43 and the hydraulic block 19 or the insert parts 49.1, 49.2 thereof are designed to be so adapted to one another that the first throttle body 83.1 in the secondary control stem open setting 66 is disposed in a first throttle body open setting 85.1 in which a preferably annular first throttle opening gap 87.1 is formed between the first throttle body 83.1 and the first throttle counter-body 84.1 (see FIG. 8) and that the second throttle body 83.2 in the secondary control stem open setting 66 is disposed in a second throttle body open setting 85.2 in which a preferably annular second throttle opening gap 87.2 is formed between the second throttle body 83.2 and the second throttle counter-body 84.2 (see FIG. 8). In addition, the secondary control stem 43 and the hydraulic block 19 or the insert parts 49.1, 49.2 thereof are adapted to one another in such a way that the first throttle body 83.1 in the secondary control stem closed setting 65 of the secondary control stem 43 is disposed in a first throttle body closed setting 88.1 (see FIG. 3) in which a preferably annular first throttle closing gap 89.1 is formed between the first throttle body 83.1 and the first throttle counter-body 84.1 (see also FIG. 5), which is very much smaller than the first throttle opening gap 87.1 and here is approximately 0.005 millimetres to approximately 0.02 millimetres. As a result, substantially no or only very little drive fluid per unit of time can pass the first closing gap 89.1. Moreover, the secondary control stem 43 and the hydraulic block 19 or the insert parts 49.1, 49.2 thereof are adapted to one another in such a way that the second throttle body 83.2 in the secondary control stem closed setting 65 of the secondary control stem 43 is disposed in a third throttle body closed setting 88.3 (see FIG. 3) in which a preferably annular third throttle closing gap 89.3 is formed between the second throttle body 83.2 and the second throttle counter-body 84.2 (see also FIG. 5), which likewise is very much smaller than the second throttle opening gap 87.2 and here is also approximately 0.005 millimetres to approximately 0.02 millimetres. As a result, substantially no drive fluid or only very little drive fluid per unit of time can pass the third throttle closing gap 89.3. Moreover, the second control stem 43 and the hydraulic block 19 or the insert parts 49.1, 49.2 thereof are adapted to one another in such a way that the secondary control stem 43 is transferrable in the axial direction 32 from its second control stem closed setting 65 to a first secondary control stem intermediate setting 90.1 and conversely (FIG. 6), in which the first throttle body 83.1 is disposed in a second throttle body closed setting 88.2 in which as before the preferably annular first throttle closing gap 89.1 is formed between the first throttle body 83.1 and the first throttle counter-body 84.1 and in which the second throttle body 83.2 is disposed in a fourth throttle body closed setting 88.4 in which as before the preferably annular third throttle closing gap 89.3 is formed between the second throttle body 83.2 and the second throttle counter-body 84.2. As a result and as before substantially no or only very little drive fluid per unit of time can pass the first throttle closing gap 89.1 and the third throttle closing gap 89.3. However, in this first secondary control stem intermediate setting 90.1 the secondary valve body 52 is lifted by its seal 59 from the contact surface 63 of the secondary valve seat 55 with formation of a first throughflow gap 91.1. In addition, the secondary control stem 43 and the hydraulic block 19 or the insert parts 49.1, 49.2 thereof are adapted to one another in such a way that the secondary control stem 43 is movable in the axial direction 32 from its first secondary control stem intermediate setting 90.1 into its secondary control stem open setting 66 and conversely (see FIG. 8), in which the first throttle body 83.1 is disposed in the first throttle body open setting 85.1 in which the first throttle opening gap 87.1 is formed between the first throttle body 83.1 and the first throttle counter-body 84.1 and in which the second throttle body 83.2 is disposed in the second throttle body open setting 85.2 in which the second throttle opening gap 87.2 is formed between the second throttle body 83.2 and the second throttle counter-body 84.2 and in which now also the secondary valve body 52 is lifted by its seal 59 from the contact surface 63 of the secondary valve seat 55 with formation of a second throughflow gap 91.2.

In the secondary control stem closed setting 65 and in the first secondary control stem intermediate setting 90.1 the first throttle counter-body 84.1 is directly opposite the first throttle body 83.1 of the secondary control stem 43 and the second throttle counter-body 84.2 is directly opposite the second throttle body 83.2 of the secondary control stem 43. In the secondary control stem closed setting 65 and in the first secondary control stem intermediate setting 90.1 a first play between the first throttle body 83.1 and the first throttle counter-body 84.1 is at most approximately 0.04 millimetres and a second play between the second throttle body 83.2 and the second throttle counter-body 84.2 is likewise at most approximately 0.04 millimetres. It is thereby ensured that a flow of the drive fluid along the seal 59, which could cause damage and/or displacement of the seal 59, is prevented over a lengthy period of use during opening and closing of the secondary check valve 23. The first play and the second play are each a minimum of approximately 0.01 millimetres. It is thereby ensured that the secondary control stem 43 of the secondary check valve 23 starting from any possible secondary control stem open setting of the secondary control stem 43 is always exclusively or solely transferred by the spring force of the secondary spring 54 to its secondary control stem closed setting 65 in which the secondary check valve 23 is blocked against throughflow of the work fluid.

The first throttle body 83.1 has a circularly cylindrical first throttle surface 92.1. The first throttle counter-body 84.1 has a circularly cylindrical first throttle counter-surface 93.1. The first throttle surface 92.1 and the first throttle counter-surface 93.1 extend in the axial direction 32. In the secondary control stem closed setting 65 of the secondary control stem 43 and in the first secondary control stem intermediate setting 90.1 of the secondary control stem 43 the first throttle surface 93.1 and the first throttle counter-surface 94.1 are radially directly opposite with formation of a first clearance fit. The first play associated with the first clearance fit is, as already mentioned, at most approximately 0.04 millimetres.

The second throttle body 83.2 has a circularly cylindrical second throttle surface 92.2. The second throttle counter-body 84.2 has a circularly cylindrical second throttle counter-surface 93.2. The second throttle surface 92.2 and the second throttle counter-surface 93.2 extend in the axial direction 32. In the secondary control stem closed setting 65 of the secondary control stem 43 and in the first secondary control stem intermediate setting 90.1 of the secondary control stem 43 the second throttle surface 92.2 and the second throttle counter-surface 93.2 are radially directly opposite with formation of a second clearance fit. The second play associated with the second clearance fit is, as already likewise mentioned in the foregoing, at most approximately 0.04 millimetres.

The first throttle surface 92.1 of the first throttle body 83.1 extends parallel to the secondary control stem longitudinal axis 46 of the secondary control stem 43 and extends parallel to the first throttle counter-surface 93.1 of the hydraulic block 19. The second throttle surface 92.2 of the second throttle body 83.2 extends parallel to the secondary control stem longitudinal axis 46 of the secondary control stem 43 and extends parallel to the second throttle counter-surface 93.2 of the hydraulic block 19. Accordingly, the first throttle surface 92.1 of the first throttle body 83.1 and the second throttle surface 92.2 of the second throttle body 83.2 extend parallel to one another. In addition, the first throttle counter-surface 93.1 of the first throttle counter-body 84.1 and the second throttle counter-surface 93.2 of the second throttle counter-body 84.2 extend parallel to one another. The first throttle surface 92.1 of the first throttle body 83.1 bounds a first throttle body outer diameter. The second throttle surface 92.2 of the second throttle body 83.2 bounds a second throttle body outer diameter. The second throttle body outer diameter of the second throttle body 83.2 is preferably approximately twice as large as the first throttle body outer diameter of the first throttle body 83.1.

The secondary control stem 43 has in an axial region between the first throttle body 83.1 and its first free secondary control stem end 44.1 a conical introduction chamfer 94. The introduction chamfer 94 tapers in a direction opposite to the first flow direction 61 from the first throttle body 83.1 to the first free secondary control stem end 44.1. It is thereby achieved that the first throttle body 83.1 on transfer of the secondary control stem 43 from its secondary control stem open setting 66 in a secondary control stem closing direction moves oppositely to the secondary control stem opening direction 67 to its first secondary control stem intermediate setting 90.1, so that the first throttle surface 92.1 of the first throttle body 83.1 and the first throttle counter-surface 93.2 of the secondary insert part 49.2 of the hydraulic block 19 are not damaged.

As apparent in FIGS. 3 to 9, the secondary valve body contact surface 60 of the secondary valve body part 57 is arranged between the seal 59 and the second throttle body 83.2 and consequently in front of the second throttle body 83.2 as considered in the first flow direction 61.

Figure 1:
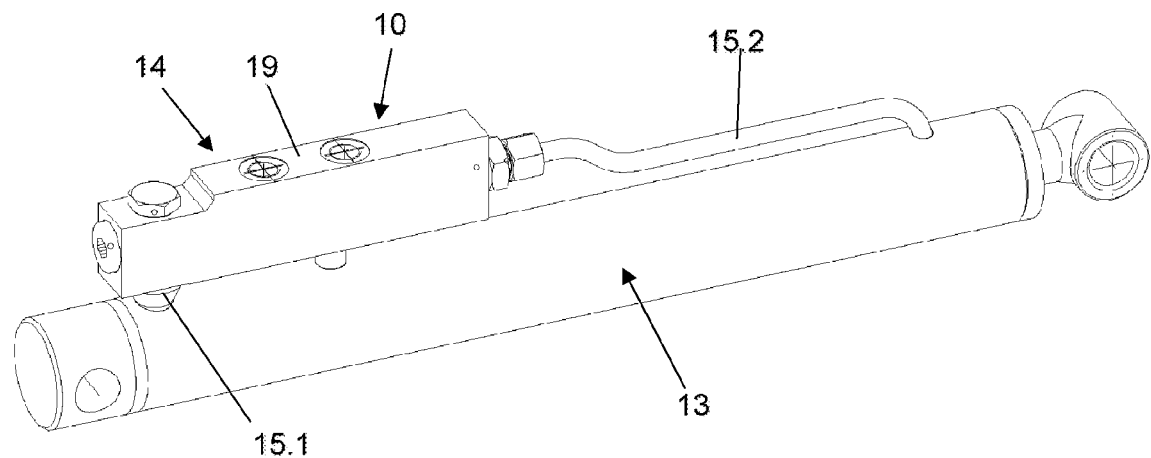
FIG. 1 shows a perspective illustration of the device.
Figure 2:
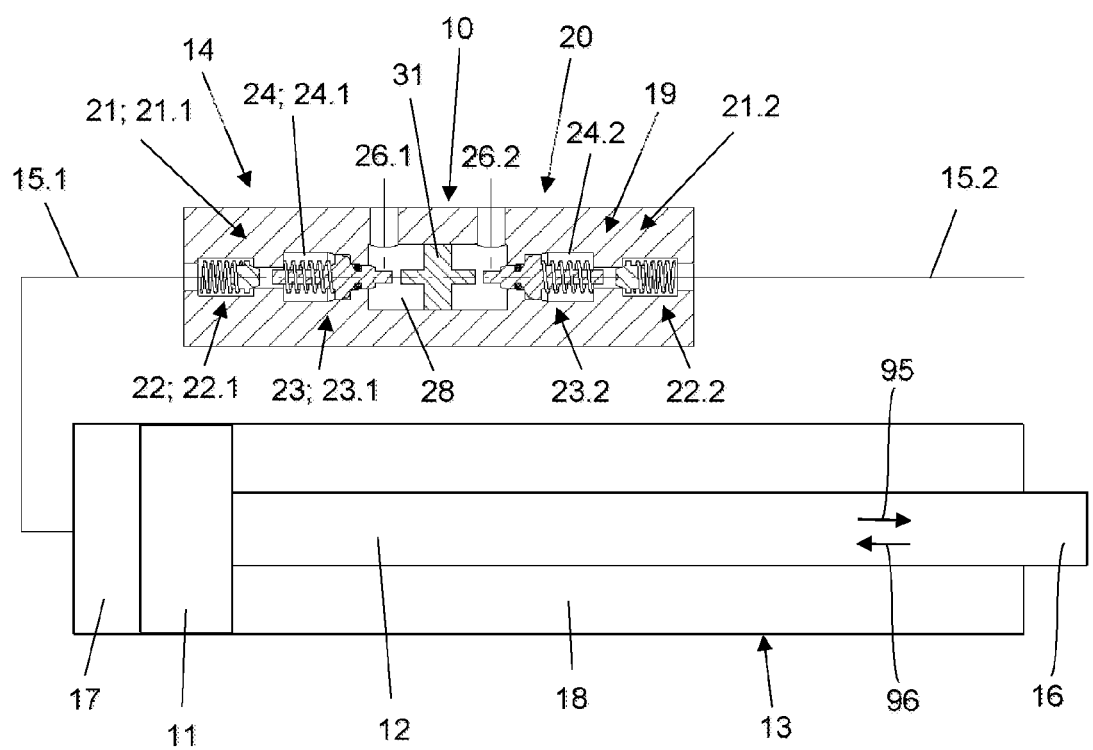
FIG. 2 shows a schematic illustration of the device.

A first method sequence is described in the following with reference to FIG. 2, in which it is achieved that the shaft 12 of the hydraulic cylinder 13 retracts, thus moves in the arrow direction 95 from the right to the left. For this purpose the second hydraulic inlet 47.2 is acted on by the drive fluid. As a result, initially the second secondary check valve 23.2 and subsequently the second primary check valve 22.2 of the second check valve arrangement 21.2 open. At the same time, through the loading of the second hydraulic inlet 47.2 with the drive fluid it is achieved that the control piston 31 moves in the arrow direction 95 from the right to left, whereby initially the first secondary check valve 23.1 and subsequently the first primary check valve 22.1 of the first check valve arrangement 21.1 are opened. As a result, on the one hand the work fluid can flow from the second hydraulic inlet 47.2 via the opened check valves 22.3, 22.2 of the second check valve arrangement 21.2 into the second work chamber 18 of the hydraulic cylinder 13 and on the other hand the work fluid displaced by the piston 11 from the first work chamber 17 can flow away via the opened check valves 22.1, 23.1 of the first check valve arrangement 21.1 through the first hydraulic inlet 47.1 then serving as first outlet.

In the following a second method sequence is in turn described with reference to FIG. 2, in which it is achieved that the shaft 12 of the hydraulic cylinder 13 moves out, thus moves in the arrow direction 96 from the left to the right. For this purpose the first hydraulic inlet 47.1 is acted on by the drive fluid. As a result, initially the first secondary check valve 23.1 and subsequently the first primary check valve 22.1 of the first check valve arrangement 21.1 open. At the same time, through the loading the first hydraulic inlet 47.1 with the drive fluid it is achieved that the control piston 31 moves in the arrow direction 96 from the left to the right, whereby initially the second secondary check valve 23.2 and subsequently the second primary check valve 22.2 of the second check valve arrangement 21.2 are opened. As a result, on the one hand the work fluid can flow from the first hydraulic inlet 47.1 via the opened check valves 23.1, 22.1 of the first check valve arrangement 21.1 into the first work chamber 17 of the hydraulic cylinder 13 and on the other hand the work fluid displaced by the piston 11 from the second work chamber 18 can flow away via the opened check valves 22.2, 23.2 of the second check valve arrangement 21.2 through the second hydraulic inlet 47.2 then serving as second outlet.

If now, for example, starting from the first method sequence the loading of the second hydraulic inlet 47.2 with work fluid is stopped so as to hold the retracting shaft 12 in setting, then initially the second primary check valve 22.2 closes and subsequently the second secondary check valve 23.2 of the second check valve arrangement 21.2 closes. Due to the absence of the pressure of the drive fluid at the control piston 31 this is urged by the spring force of the secondary spring 54 of the first secondary check valve 23.1 with the help of the secondary control stem 43.1 thereof back in the direction of its neutral setting 41. If, in particular, the free end 43 of the shaft 12 is engaged by a load which, for example, seeks to displace the shaft 12 in the arrow direction 95 from the right to the left then this produces a forced closing of the first primary check valve 22.1 of the first check valve arrangement 21.1, whereupon the first secondary check valve 23.1 thereof also closes with a delay in time. The piston 11 is then held in setting secured under the load by the closed first primary check valve 22.1 of the first check valve arrangement 21.1 and, in particular, safeguarded by the closed first secondary check valve 23.1 of the first check valve arrangement 21.1.

If the first primary check valve 22 is leaky or becomes leaky over the period of use, for example due to wear of the primary valve body 69 and/or the primary valve seat 72, then the fully tight secondary check valve 23 continues to secure the shaft 12, which is subject to the load, in its setting. Such a leakiness of the primary check valve 22, however, can have the consequence that the work fluid standing under pressure builds up in the cavity 58 of the second opening 25.2 in front of the secondary valve body 52, thus is present thereat in compressed form. If, starting therefrom, the secondary check valve 23 is controlled open to either move the shaft 12 out in arrow direction 96 from left to right or to move the shaft 12 in in arrow direction 95 from right to left this leads, during controlling open of the secondary check valve 23 of the relevant check valve arrangement 21, to formation of a decompression flow along the seal 59 of the secondary check valve 23 of this check valve arrangement 21.

In the case of the devices known from the prior art this can have the consequence that the seals used therein of the secondary valve body used there are damaged (wear) and/or displaced. Prevention of this is a principal object of the invention.

The procedures on opening of the two check valves 22, 23 are described in the following starting from the situation in which in the first check valve arrangement, which is shown on the left in FIG. 3, of the device 10 according to the invention both the primary check valve 22 and the secondary check valve 23 are closed. In that case again for reasons of simplification only the respective basic reference numerals are used.

In the longitudinal section, which is shown in FIG. 3, of the device 10 the primary valve body 69 of the primary check valve 22 of the check valve arrangement 21 is disposed, loaded by the spring force of the primary spring 71, in its primary valve body closed setting 70 and the secondary valve body 52 of the secondary check valve 23 is disposed, loaded by the spring force of the secondary spring 54, in its secondary valve body closed setting 53. Starting from that initially the secondary check valve 23 and subsequently the primary check valve 21 are now opened.

An enlarged detail of a longitudinal section in the region of the check valve 21 shown at the bottom in FIG. 3 is shown in FIG. 4. By contrast thereto the secondary control stem 43 of the secondary check valve 23 is now displaced in a secondary control stem opening direction 67 (here from the right to the left) by means of the control piston 31 from its secondary control stem closed setting 65 against the spring force of the secondary spring 54 into a transition setting 99 in which the two throttles 82.1, 82.2 formed in front of and behind the seal 59 of the secondary valve body 52 of the second check valve 23 are still closed, thus the throttle bodies 83.1, 83.2 thereof are in their throttle body closed settings 88.1, 88.2 in which the first throttle closing gap 89.1 and the third throttle closing gap 89.3 are formed, and in which the seal 59 is still not yet lifted from the contact surface 63, which is associated therewith, of the secondary valve seat 55 of the secondary check valve 23 and in which the primary check valve 22 is still closed.

Figure 5:
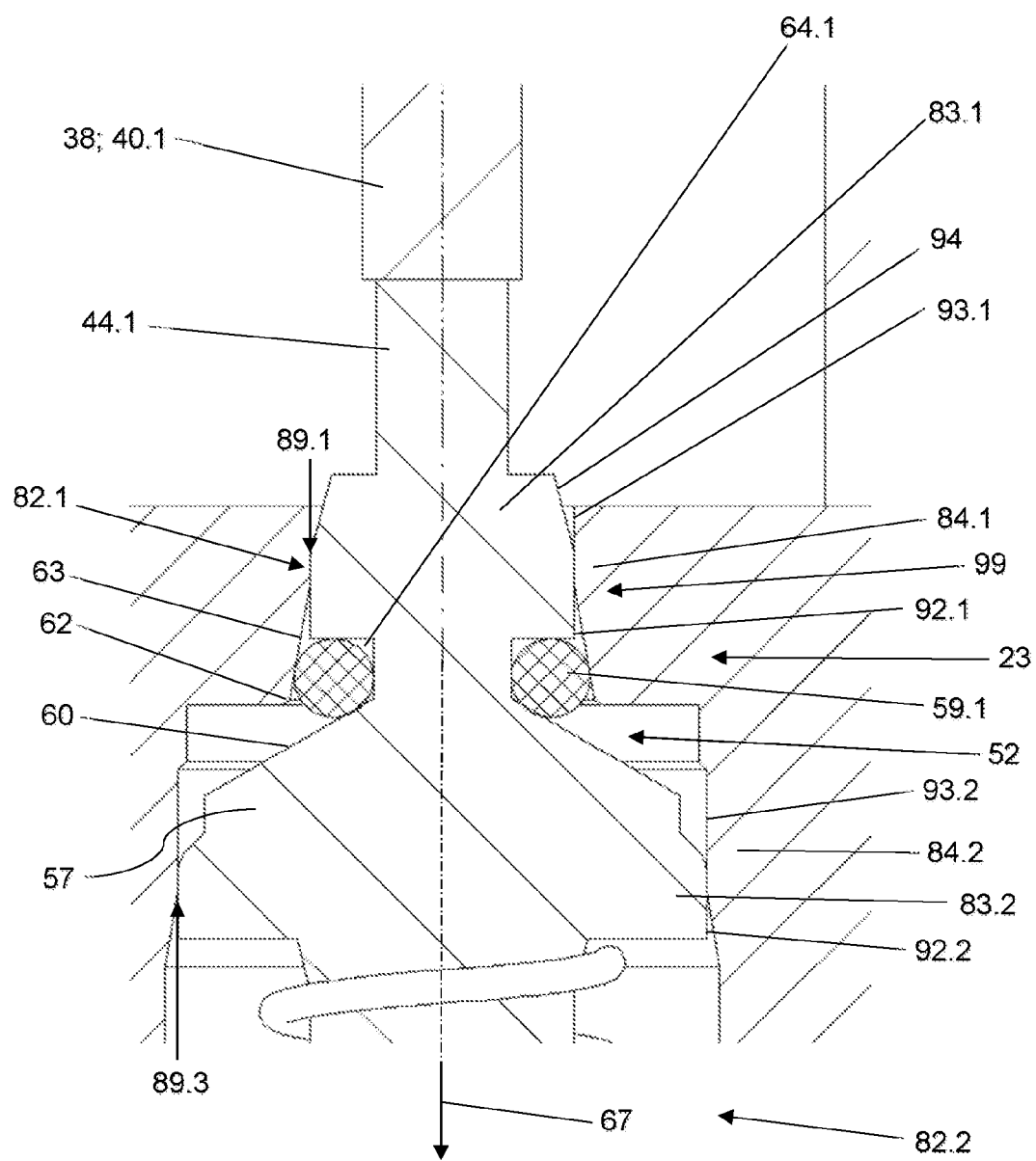
FIG. 5 shows a substantially enlarged detail of the longitudinal section according to FIG. 4 in the region of the secondary check valve.

A substantially enlarged detail of the longitudinal section according to FIG. 4 in the region of the secondary check valve 23 is shown in FIG. 5 for the purpose of better illustration of this transition setting 99.

Figure 6:
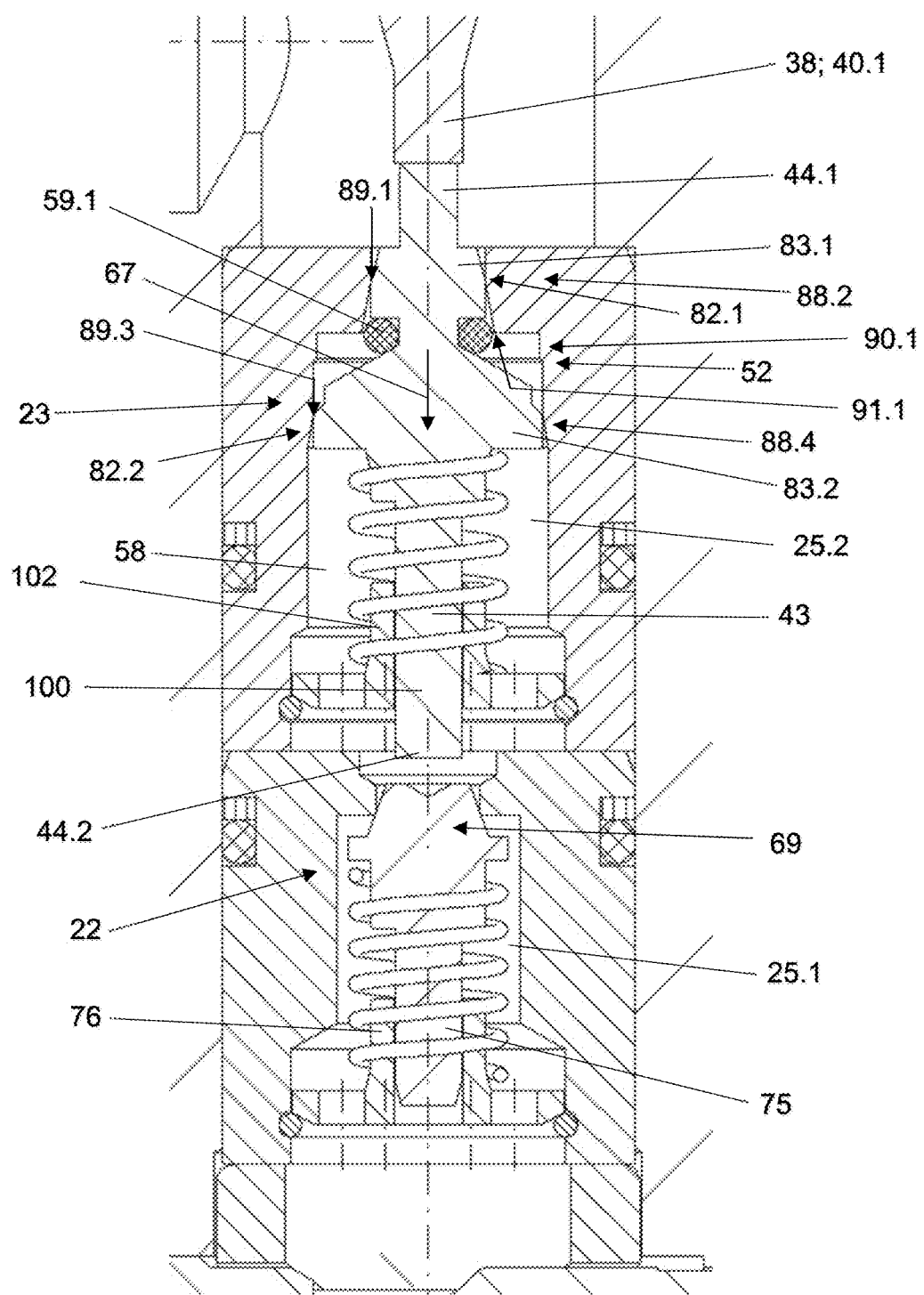
FIG. 6 shows the longitudinal section according to FIG. 4, wherein by contrast thereto the secondary control stem is now further displaced in its secondary control stem opening direction into a first secondary control stem intermediate setting.

FIG. 6 shows the longitudinal section according to FIG. 4. By contrast thereto the secondary control stem 43 is now displaced by means of the control piston 31 further in its secondary control stem opening direction 67 against the spring force of the secondary spring 54 into the first secondary control stem intermediate setting 90.1 in which the two throttles 82.1, 82.2 formed in front of and behind the seal are as before closed, thus the throttle bodies 83.1, 83.2 thereof are in their throttle body closed settings 88.1, 88.2 in which as before the first throttle closing gap 89.1 and the third throttle closing gap 89.3 are formed, but in which the seal 59 is now lifted from the contact surface 63, which is associated therewith, of the secondary valve seat 55, wherein the primary check valve 22 is still closed.

FIG. 7 shows a substantially enlarged detail of the longitudinal section according to FIG. 6 in the region of the secondary check valve 23. By contrast thereto the secondary control stem 43 is now displaced by means of the control piston 31 somewhat further in its secondary control stem opening direction 67 against the spring force of the secondary spring 54 into a second secondary control stem intermediate setting 90.2 in which the second throttle 82.2 formed after the seal 59 is already open, thus the second throttle body 83.2 is in a third throttle body open setting 85.3 in which a third throttle opening gap 87.3, which is preferably smaller than the second throttle opening gap, is formed between the second throttle body 83.2 and the second throttle counter-body 84.2, but the first throttle 82.1 formed in front of the seal 59 or the third throttle closing gap 89.3 is still closed, thus the first throttle body 83.1 as before is in a throttle body closed setting in which the first throttle closing gap 89.1 is still formed.

In this second secondary control stem intermediate setting 90.2 the seal 59 is again lifted from the support surface 63, which is associated therewith, of the secondary valve seat 55. Moreover, the primary check valve 22, which is not shown here, is still closed.

FIG. 8 shows the longitudinal section according to FIG. 6. By contrast thereto, the secondary control stem 43 is now further displaced in its secondary control stem opening direction 67 by means of the control piston 31 against the spring force of the secondary spring 54 into the secondary control stem open setting 66, in which now also the first throttle 82.1 formed in front of the seal 59 or the first throttle opening gap 89.1 is opened, thus the first throttle body 83.1 is now also in a or the throttle body open setting 85.1 in which a or the first throttle opening gap 87.1 is formed and in which as before the second throttle 82.2 formed after the seal or the second throttle closing gap 89.2 is opened, wherein the second throttle body 83.2 is in its second throttle body open setting in which the second throttle opening gap 87.2 is formed and in which the seal 59 furthermore is lifted from the contact surface 63, which is associated therewith, of the secondary valve seat 55. A through passage for the work fluid through the secondary check valve 23 is thereby freed, which is schematically illustrated in FIG. 8 by an arrow sequence 68. The secondary control stem 43 is shown in FIG. 8 in a setting in which the second free secondary control stem end 44.2, which is opposite the primary valve body 22, of the secondary control stem 43 is bearing against the primary valve body 69, which is in its primary valve body closed setting 70, of the then still closed primary check valve 21.

FIG. 9 shows the longitudinal section according to FIG. 8. By contrast thereto the secondary control stem 43 is now further displaced by means of the control piston 31 in its secondary control stem opening direction 67 against the spring force of the secondary spring 54, whereby at the same time the primary valve body 69 is displaced against the spring force of the primary spring 71 of the primary check valve 22 into the primary valve body open setting 73 so that now a through passage 80 for the work fluid through both the secondary check valve 23 and the primary check valve 22 is freed.

Due to the two throttle closing gaps 89.1, 89.2 formed in the secondary control stem closed setting 65 of the secondary control stem 43 (secondary valve plunger) of the secondary check valve 23 it is ensured in every case that on closing of the secondary check valve 83 the formation of a flow of the drive fluid from the relevant work chamber 17, 18 of the hydraulic cylinder along the elastomeric seal 59 of the secondary valve body 52, which could lead to wear or displacement of the elastomeric seal 59, is excluded, because firstly the two throttles 82.1, 82.2 or the throttle opening gaps 87.1, 87.2 thereof are closed, thus the throttle closing gaps 89.1, 89.2 are formed, before the elastomeric seal 59 enters into engagement, thus comes into contact with the contact surface 63 of the secondary valve seat 55. Analogously, on opening of the secondary check valve 23 firstly the elastomeric seal 59 comes out of engagement before also only one of the two throttle closing gaps 89.1, 89.2 or one of the two throttles 82.1, 82.2 is opened. It is thereby prevented that a possible decompression flow of the drive fluid could lead to wear and/or displacement of the seal 59.

By contrast to FIGS. 2 to 9, in which a respective sealing ring 59.1 constructed as an O-ring is shown as seal 59 of the secondary valve body 52, in FIGS. 10 to 13 an alternative preferred seal 59 in the form of a special sealing ring 59.2 is shown. The separate sealing ring 59.2 is shown in an uninstalled, unstressed state in FIGS. 10, 11.1 and 11.2. A detail of the longitudinal section, which is shown in FIG. 3, of the hydraulic block is shown in FIG. 12, wherein instead of the seal 59.1 constructed as an O-ring the sealing ring 59.2 according to FIG. 10 is used. FIG. 13 shows a substantially enlarged detail of the longitudinal section according to FIG. 7, wherein instead of the sealing ring 59.1 constructed as an O-ring the sealing ring 59.2 according to FIG. 10 is used. The sealing ring 59.2 is likewise resiliently compressible. The sealing ring 59.2 is also formed to be rotationally symmetrical with respect to its axial axis. It has an inner diameter 112 and an outer diameter 113. The sealing ring 59.2 is also formed as an encircling ring, preferably of solid material. However, the sealing ring 59.2 has a trapezium-shaped cross-section. The sealing ring 59.2 has a circularly cylindrical sealing ring inner surface 104 spanning the inner diameter 111. The sealing ring 59.2 has a maximum sealing ring width 103 as considered in the axial direction 32. The circularly cylindrical sealing ring inner surface 104 extends over an axial length 105 as considered in the axial direction 32. The axial length 105 corresponds with the maximum sealing ring width 103. The axial length 105 is thus the same size as the maximum sealing ring width 103. The sealing ring 59.2 is received in a radially outwardly open annular groove 64.2 of the secondary control stem 43. The groove 64.2 has a groove base 106.2, which is bounded by a circularly cylindrical groove base surface 110.2. The groove base surface 110.2 extends parallel to the secondary control stem axial axis 46. The sealing ring 59.2 bears over its cylindrical sealing ring inner surface 104 under a bias against a circularly cylindrical groove base 106.2 of the groove 64.2. This is achieved by the inner diameter 112 of the sealing ring inner surface 104 of the sealing ring 59.2 being smaller than the outer diameter of the groove base surface 110.2 of the groove base 106.2 of the groove 64.2. The sealing ring 59.2 has on its first sealing ring side 107.1 facing the secondary valve body contact surface 60 a planar first sealing ring contact surface 108.1. The first sealing ring contact surface 108.1 is formed perpendicularly to the sealing ring inner surface 104. The sealing ring 59.2 can be supported by its first sealing ring contact surface 108.1 on a planar first side surface 109.1, which is opposite thereto, of the groove 64.2. The first side surface 109.1 of the groove 64.2 extends perpendicularly to the secondary control stem axial axis 46 of the secondary control stem 43. The sealing ring 59.2 has a planar second sealing ring contact surface 108.2 on its second sealing ring side 107.2 which faces the first throttle body 83.1 and is remote from the second throttle body 83.2. The second sealing ring contact surface 108.2 is formed perpendicularly to the sealing ring inner surface 104. The second sealing ring contact surface 108.2 is thus formed to be parallel to the first sealing ring contact surface 108.1. The sealing ring 59.2 is supported by its second sealing ring contact surface 108.2 on a planar second side surface 109.2, which is opposite thereto, of the groove 64. The second side surface 109.2 of the groove 64.2 extends perpendicularly to the secondary control stem axial axis 46 of the secondary control stem 43. The sealing ring 59.2 has a sealing ring part 115 which is associated with the secondary valve seat 55 and extends radially outwardly from the sealing ring inner surface 104 and which on the one hand, as considered in the axial direction 32, tapers conically towards the secondary valve body 52 and on the other hand, as also considered in the axial direction 32, tapers conically away from the secondary valve body 52. It is apparent in the axial cross-section shown in FIG. 11 that the sealing ring part 115 has a first sealing-ring-part surface 116.1 which includes a first angle 117.1 with the first sealing ring contact surface 108.1 and further has a second sealing-ring-part surface 116.2 which includes a second angle 117.2 with the second sealing ring contact surface 108.2. The first angle 117.1 is smaller than the second angle 117.2. The first angle 117.1 is, for example, 40 degrees. The second angle 117.2 is, for example, 55 degrees. However, it will be understood that other angle values can also be provided. For example, it can also be provided that the first angle and the second angle are the same size. The sealing ring 59.2 can preferably consist of PUR (polyurethane), particularly of a PUR elastomer. It can preferably have a hardness of 95 Shore A or a Shore hardness of 95 SH A. The sealing ring 59.2 can advantageously be produced by machining or by material removal, for example by turning. However, it can also be produced in a different way, for example by injection moulding.

In FIGS. 12 and 13, with the exception of the sealing ring 59.2 and the groove 64.2 all other components are of the same form as in FIGS. 3 to 9. In other words, the components, which are shown in FIGS. 12 and 13, differ from the components shown in FIGS. 3 to 9 exclusively by the fact that in FIGS. 12 and 13 the sealing ring 59.2 and the groove 64.2 are provided, whereas in FIGS. 3 to 9 the sealing ring 59.1 and the groove 64.1 are provided. Accordingly, and for better illustration of the differences the other reference numerals already shown in FIGS. 3 to 9 are not shown again in FIGS. 12 and 17. The foregoing functions, sequences and procedures described in the foregoing in connection with FIGS. 1 to 9 also apply in corresponding manner to the example of embodiment shown in FIGS. 12 and 13.

Significant features of the invention can also be summarised as follows:
- the double check valve 20 is suitable for a double-acting cylinder for safeguarding the piston side and the rod side;
- it can also be used and executed only as a single check valve in redundant configuration, thus in the form of a check valve arrangement with a primary check valve and a secondary check valve;
- the primary check valve 22 and the secondary check valve 23 are arranged in series (serially);
- they are thereby of redundant configuration in safeguarding;
- the primary check valve 22 ensures a closed chamber and thus a small decompression volume of the secondary valve 23;
- the secondary check valve 23 has a seal 59 of elastomer (elastomeric seal) in addition to the metallic seal (secondary valve body part 57 vs. secondary shoulder 62);
- the control piston 31 initially opens the second valve 23, a pin—which after a certain travel controls open the primary check valve 22—being present at this valve plunger (control piston control stem 38);
- for controlling open the secondary check valve 23 the primary check valve 22 still remains closed;
- the sequence of opening is thus guaranteed by a geometric construction;
- initially the secondary check valve 23 opens, the primary valve 22 being controlled open only thereafter;
- for closing, initially the primary valve 22 is closed before the secondary check valve 23 closes;
- the elastomeric seal 59 (elastomer seal) of the secondary check valve 23 is protected against wear as a consequence of a decompression flow of the work fluid and/or as a consequence of dynamic pressure flow of the drive fluid through formation of a first throttle closing gap 89.1 in front of the seal 59 and through formation of a second throttle closing gap 89.2 after the seal 59 in that the throttles 82.1, 82.2 allow throughflow of the drive fluid only when the seal 59 is no longer in engagement.

REFERENCE NUMERAL LIST 10 device
11 piston
12 stem
13 hydraulic cylinder
14 separating arrangement
15.1 first supply branch
15.2 second supply branch
16 free end of 12
17 (first) work chamber
18 (second) work chamber
19 hydraulic block
20 double check valve
21 check valve arrangement
21.1 (first) check valve arrangement/(first) check valve
21.2 (second) check valve arrangement/(second) check valve
22 primary check valve
22.1 first primary check valve
22.2 second primary check valve
23 secondary check valve
23.1 first secondary check valve
23.2 second secondary check valve
24 lock chamber
24.1 first lock chamber
24.2 second lock chamber
25.1 first opening of 24.1
25.2 second opening of 24.1
25.3 third opening of 24.2

25.4 fourth opening of 24.2
26.1 first hydraulic inlet (first outlet)
26.2 second hydraulic inlet (second outlet)
28 connecting chamber
28.1 first connecting space chamber
28.2 second connecting space chamber
29 connecting chamber longitudinal axis
30.1 (first) lock chamber longitudinal axis of 24.1
30.2 (second) lock chamber longitudinal axis of 24.2
31 control piston/unblocking means
32 axial direction
33 groove (in control piston)
34 control piston seal
35 control piston guide part
36.1 guide surface
36.2 guide surface
37 counter-guide surface of 28
38 control piston control stem
38.1 first control piston control stem
38.2 second control piston control stem
39 control piston longitudinal axis
40.1 first control piston control stem end
40.2 second control piston control stem end
41 neutral setting (of 35)
43 secondary control stem
43.1 first secondary control stem
43.2 second secondary control stem
44.1 first (free) secondary control stem end of 43
44.1.1 first (free) secondary control stem end of 43.1
44.1.2 second (free) secondary control stem end of 43.1
44.2 second (free) secondary control stem end of 43
44.2.1 first (free) secondary control stem end of 43.2
44.2.2 second (free) secondary control stem end of 43.2
45.1 (first axial) spacing
45.2 (second axial) spacing
46 secondary control stem axial axis (secondary control stem longitudinal axis)
47.1 first hydraulic inlet channel
47.2 second hydraulic inlet channel
49.1 primary insert part
49.1.1 primary insert part
49.1.2 primary insert part
49.2 secondary insert part
49.2.1 secondary insert part
49.2.2 secondary insert part
50 seal
52 secondary valve body
52.1 first secondary valve body
52.2 second secondary valve body
53 secondary valve body closed setting
54 secondary spring
55 secondary valve seat
56 secondary valve body open setting
57 secondary valve body part
58 cavity of 30.2
59 seal of 52
59.1 sealing ring
59.2 sealing ring
60 secondary valve body (part) contact surface of 57
61 first flow direction
62 secondary shoulder
63 (conical) contact surface of 55
64.1 groove
64.2 groove
65 secondary control stem closed setting
66 secondary control stem open setting
67 secondary control stem opening direction
68 through passage (arrow sequence)
69 primary valve body
69.1 first primary valve body
69.2 second primary valve body
70 primary valve body closed setting
71 primary spring
72 primary valve seat
73 primary valve body open setting
74 primary guide stem axial axis/primary guide stem longitudinal axis
75 primary guide stem
76 primary guide stem receiver
77 primary valve body part
78 (conical) primary valve body contact surface
79 primary shoulder
80 through passage
81 axial spacing
82.1 first throttle
82.2 second throttle
83.1 first throttle body
83.2 second throttle body
84.1 first throttle counter-body
84.2 second throttle counter-body
85.1 first throttle body open setting
85.2 second throttle body open setting
85.3 third throttle body open setting
87.1 first throttle opening gap (of 82.1)
87.2 second throttle opening gap (of 82.2)
87.3 third throttle opening gap (of 82.2)
88.1 first throttle body closing setting (of 83.1)
88.2 second throttle body closing setting (of 83.1)
88.3 third throttle body closed setting (of 83.2)
88.4 fourth throttle body closed setting (of 83.2)
89.1 first throttle closing gap
89.3 third throttle closing gap
90.1 (first) secondary control stem intermediate setting
90.2 (second) secondary control stem intermediate setting
91.1 first throughflow gap (in 90.1, seal lifted)
91.2 second throughflow gap (in 90.2, seal lifted)
92.1 first throttle surface of 83.1
92.2 second throttle surface of 83.2
93.1 first throttle counter-surface of 84.1
93.2 second throttle counter-surface of 84.2
94 (conical) introduction chamfer
95 (arrow) direction
96 (arrow) direction
97 groove
98 receiver
99 transition setting
100 secondary guide stem
101 secondary guide stem axial axis/secondary guide stem longitudinal axis
102 secondary guide stem receiver
103 (maximum) sealing ring width of 59.2
104 sealing ring inner surface of 59.2
105 axial length of 104
106.1 groove base of 64.1
106.2 groove base of 64.2
107.1 (first) sealing ring side of 59.2
107.2 (second) sealing ring side of 59.2
108.1 (first) sealing ring contact surface of 59.2
108.2 (second) sealing ring contact surface of 59.2
109.1 (first) side surface of 64.2
109.2 (second) side surface of 64.2
110.1 groove base surface of 64.1
110.2 groove base surface of 64.2
111 axial axis of 59.2

112 inner diameter of 59.2
113 outer diameter of 59.2
115 sealing ring part
116.1 (first) sealing-ring-part surface
116.2 (second) sealing-ring-part surface
117.1 (first) angle
117.2 (second) angle

The invention claimed is:

1. A device (10) for holding a shaft (12), which is provided with a piston (11), of an at least single-acting hydraulic cylinder (13) in a setting of the piston, the cylinder having work chambers (17, 18), which are separated from one another by the piston (11), for the drive fluid, wherein the shaft (12) together with the piston (11) is movable along the hydraulic cylinder (13), comprising a hydraulic block (19) which encloses a lock chamber (24) having a first opening (25.1) and a second opening (25.2), wherein the first opening (25.1) is provided with a primary check valve (22) and is in hydraulic connection with one work chamber (17) of the work chambers (17, 18) and wherein the second opening (25.2) is provided with a secondary check valve (23) and is in hydraulic connection with a hydraulic inlet (26.1) for supply of the one work chamber (17) with the drive fluid, and wherein the primary check valve (22) and the secondary check valve (23) are arranged in series connection, and wherein the secondary check valve (23) comprises a secondary control stem (43) which is movable in an axial direction (32) relative to the hydraulic block (19) and is provided with a secondary valve body (52), the secondary valve body (52) being movable in the axial direction relative to the hydraulic block (19) by way of unblocking means (31) from a secondary valve body closed setting (53) of the secondary valve body, in which the secondary valve body (52) bears against a secondary valve seat (55) of the hydraulic block (19) under loading by a spring force of a secondary spring (54), against the spring force of the secondary spring (54) into a secondary valve body open setting (56) in which throughflow of the drive fluid through the secondary check valve (23) is possible, and wherein the secondary valve body (52) is provided with a seal (59) which in the secondary valve body closed setting (53) of the secondary valve body (52) bears tightly against a contact surface (63) of the secondary valve seat (55) of the hydraulic block (19) so that the secondary check valve (23) is blocked against throughflow of the drive fluid, and wherein the secondary control stem (43) in the secondary valve body closed setting (53) of the secondary valve body (52) is in a secondary control stem closed setting (65) and wherein the secondary control stem (43) in the secondary valve body open setting (56) of the secondary valve body (52) is in a secondary control stem open setting (66), and wherein the primary check valve (22) comprises a primary valve body (69) which is movable relative to the hydraulic block (19) from a primary valve body closed setting (70) of the primary valve body to a primary valve body open setting (73) of the primary valve body by means of the secondary control stem (43) of the secondary check valve (23) against the spring force of the primary spring (71), wherein the primary valve body (69) bears against a primary valve seat (72) of the hydraulic block (19) under loading by a spring force of the primary spring (71) in the primary valve body closed setting (70), and wherein throughflow of the drive fluid through the primary check valve (22) is possible in the primary valve body open setting (73), and wherein in the primary valve body open setting (73) of the primary valve body (69) and in the secondary valve body open setting (56) of the secondary valve body (52) a through passage (80) for the drive fluid is opened up so that the drive fluid can flow from the first hydraulic inlet (26.1) via the lock chamber (24) to the work chamber (17) and from the work chamber (17) via the lock chamber (24) to the first hydraulic inlet (26.1), and wherein a free secondary control stem end (44.2), which faces the primary valve body (69), of the secondary control stem (43) in the secondary valve body closed setting (53) of the secondary valve body (52) and in the primary valve body closed setting (70) of the primary valve body (69) is arranged at an axial spacing (81) from the primary valve body, wherein the secondary check valve (23) has a first throttle (82.1) which is formed in front of the seal (59) as considered in a first flow direction (61) of the drive fluid from the hydraulic inlet (26.1) through the lock chamber (24) to the work chamber (17) and which is formed by a first throttle body (83.1) of the secondary control stem (43) and by a first throttle counter-body (84.1) of the hydraulic block (19), and the secondary control stem (43) and the hydraulic block (19) are adapted to one another in such a way that the first throttle body (83.1) in the secondary control stem open setting (66) is in a first throttle body open setting (85.1) in which a first a throttle opening gap (87.1) is formed between the first throttle body (83.1) and the first throttle counter-body (84.1), and that the first throttle body (83.1) in the secondary control stem closed setting (65) of the secondary control stem (43) is directly opposite the first throttle counter-body (84.1) of the hydraulic block (19) and is in a first throttle body closed setting (88.1) in which a first throttle closing gap (89.1) which is very much smaller than the first throttle opening gap (87.1) is formed between the first throttle body (83.1) and the first throttle counter-body (84.1), and that the secondary control stem (43) is transferrable in the axial direction (32) from the secondary control stem closed setting (65) into a secondary control stem intermediate setting (90.1) and from the secondary control stem intermediate setting (90.1) into the secondary control stem closed setting (65), wherein in the secondary control stem intermediate setting (90.1) the first throttle body (83.1) is in a second throttle body closed setting (88.2) in which the first throttle closing gap (89.1) or a second throttle closing gap which is very much smaller than the first throttle opening gap (87.1) is formed between the first throttle body (83.1) and the first throttle counter-body (84.1) and in which the seal (59) of the secondary valve body (52) is lifted from the contact surface (63) of the secondary valve seat (55), and that the secondary control stem (43) is movable in the axial direction (32) from the secondary control stem intermediate setting (90.1) into the secondary control stem open setting (66) and from the secondary control stem open setting (66) into the secondary control stem intermediate setting (90.1), wherein in the secondary control stem open setting (66) the first throttle body (83.1) is in the first throttle body open setting (85.1) in which the first throttle opening gap (87.1) is formed between the first throttle body (83.1) and the first throttle counter-body (84.1) and in which the seal (59) of the secondary valve body (52) remains lifted from the contact surface (63) of the secondary valve seat (55)

and/or wherein the secondary check valve (23) has a second throttle (82.2) which is formed after the seal (59) as considered in a first flow direction (61) of the drive fluid from the hydraulic inlet (26.1) through the lock chamber (24) to the work chamber (17) and which is formed by a second throttle body (83.2) of the secondary control stem (43) and by a second throttle counter-body (84.2) of the hydraulic block (19), and the secondary control stem (43) and the hydraulic block (19) are adapted to one another in such a way that the second throttle body (83.2) in the secondary control stem open setting (66) is in a second throttle body open setting (85.2) in which a second throttle opening gap (87.2) is formed between the second throttle body (83.2) and the second throttle counter-body (84.2), and that the second throttle body (83.2) in the secondary control stem closed setting (65) of the secondary control stem (43) is directly opposite the second throttle counter-body (84.2) of the hydraulic block (19) and is in a third throttle body closed setting (88.3) in which a third throttle closing gap (89.3) which is very much smaller than the second throttle opening gap (87.2) is formed between the second throttle body (83.2) and the second throttle counter-body (84.2), and that the secondary control stem (43) is transferrable in the axial direction (32) from the secondary control stem closed setting (65) into a secondary control stem intermediate setting (90.1) and from the secondary control stem intermediate setting (90.1) into the secondary control stem closed setting (65), wherein in the secondary control stem intermediate setting (90.1) the second throttle body (83.2) is in a fourth throttle body closed setting (88.4) in which the third throttle closing gap (89.3) or a fourth throttle closing gap which is very much smaller than the second throttle opening gap (87.2) is formed between the second throttle body (83.2) and the second throttle counter-body (84.2) and in which the seal (59) of the secondary valve body (52) is lifted from the contact surface (63) of the secondary valve seat (55)

and that the secondary control stem (43) is movable in the axial direction (32) from the secondary control stem intermediate setting (90.1) into the secondary control stem open setting (66) and from the secondary control stem open setting (66) into the secondary control stem intermediate setting (90.1), wherein in the secondary control stem open setting (66) the second throttle body (83.2) is in the second throttle body open setting (85.2) in which the second throttle opening gap (87.2) is formed between the second throttle body (83.2) and the second throttle counter-body (84.2) and in which the seal (59) of the secondary valve body (52) remains lifted from the contact surface (63) of the secondary valve seat (55).

2. The device according to claim 1, wherein the first throttle body (83.1) has a cylindrical first throttle surface (92.1) and the first throttle counter-body (84.1) has a cylindrical first throttle counter-surface (93.1), which extend in the axial direction (32) and which lie directly opposite in the secondary control stem closed setting (65) of the secondary control stem (43)

and/or the second throttle body (83.2) has a cylindrical second throttle surface (92.2) and the second throttle counter-body (84.2) has a cylindrical second throttle counter-surface (93.2), which extend in the axial direction (32) and are directly opposite in the secondary control stem closed setting (65) of the secondary control stem (43).

3. The device according to claim 2, wherein the first throttle surface (92.1) of the first throttle body (83.1) extends parallel to a secondary control stem axial axis (46) of the secondary control stem (43) and at least in the secondary control stem closed setting (65) extends parallel to the first throttle counter-surface (93.1) of the hydraulic block (19)

and/or the second throttle surface (92.2) of the second throttle body (83.2) extends parallel to a secondary control stem axial axis (46) of the secondary control stem (43) and at least in the secondary control stem closed setting (65) extends parallel to the second throttle counter-surface (93.2) of the hydraulic block (19).

4. The device according to claim 2, wherein the first throttle surface (92.1) of the first throttle body (83.1) and the second throttle surface (92.2) of the second throttle body (83.2) extend parallel to one another and wherein the first throttle counter-surface (93.1) of the first throttle counter-body (84.1) and the second throttle counter-surface (93.2) of the second throttle counter-body (84.2) extend parallel to one another.

5. The device according to claim 1, wherein the first throttle body (83.1) has a cylindrical first throttle surface (92.1) and the first throttle counter-body (84.1) has a cylindrical first throttle counter-surface (93.1), which extend in the axial direction (32) and are directly opposite in the secondary control stem intermediate setting (90.1) of the secondary control stem (43)

and/or the second throttle body (83.2) has a cylindrical second throttle surface (92.2) and the second throttle counter-body (84.2) has a cylindrical second throttle counter-surface (93.2), which extend in the axial direction (32) and are directly opposite in the secondary control stem intermediate setting (90.1) of the secondary control stem (43).

6. The device according to claim 1, wherein the secondary valve body (52) has a secondary valve body part (57) which has a conical, concave, spherical or part-spherical secondary valve body contact surface (60) which widens outwardly as considered in the first flow direction (61) and by which the secondary valve body part (57) of the second valve body (52) in the secondary valve body closed setting (53) bears against a secondary shoulder (62) of the hydraulic block (19).

7. The device according to claim 1, wherein the seal (59) is a sealing ring (59.1, 59.2) which is received in an outwardly open groove (64; 64.1, 64.2) of the secondary control stem (43).

8. The device according to claim 7, wherein the sealing ring (59.2) has a cylindrical sealing ring inner surface (104) by way of which the sealing ring (59.2) bears against a cylindrical groove base (106.2) of the groove (64.2).

9. The device according to claim 8, wherein the sealing ring (59.2) has a maximum sealing ring width (103) as considered in the axial direction (32) and wherein the cylindrical sealing ring inner surface (104) as considered in the axial direction (32) extends over an axial length (105) corresponding with at least a third of the maximum sealing ring width (103) or with at least half the maximum sealing ring width (103) or with at least two-thirds of the maximum sealing ring width (103) or with the maximum sealing ring width (103).

10. The device according to claim 8, wherein the sealing ring (59.2) has on a first sealing ring side (107.1) facing the secondary valve body contact surface (60) a planar first sealing ring contact surface (108.1) by which the sealing ring (59.2) is supportable or supported on a planar first side surface (109.1), which is opposite the first sealing ring contact surface (108.1), of the groove (64.2).

11. The device according to claim 8, wherein the sealing ring (59.2) has on a second sealing ring side (107.2) facing the first throttle body (83.1) and/or on a second sealing ring side (107.2) remote from the second throttle body (83.2) a planar second sealing ring contact surface (108.2) by which the sealing ring (59.2) is supportable on supported on a planar second side surface (109.2), which is opposite the second sealing ring contact surface (108.2), of the groove (64.2).

12. A method of unblocking the secondary check valve (23) of the device (10) according to claim 1,
    wherein
    starting from the secondary valve body closed setting (53) in which the secondary control stem (43) is in the secondary control stem closed setting (65) and in which the first throttle body (83.1) of the secondary control stem (43) is in the first throttle body closed setting (88.1) and in which the seal (59) of the secondary valve body (52) tightly bears against the contact surface (63) of the secondary valve seat (55) of the hydraulic block (19) so that the secondary check valve (23) is blocked against throughflow of the drive fluid
    the secondary control stem (43) is transferred in the axial direction (32) in a secondary control stem opening direction (67) to the secondary control stem intermediate setting (90.1) in which the first throttle body (83.1) is in the second throttle body closed setting (88.2) in which the first throttle closing gap (89.1) or the second throttle closing gap is formed between the first throttle body (83.1) and the first throttle counter-body (84.1) and in which the seal (59) of the secondary valve body (52) is lifted from the contact surface (63) of the secondary valve seat (55) of the hydraulic block (19),
    whereupon the secondary control stem (43) is further transferred in the secondary control stem opening direction (67) to the secondary control stem open setting (66) in which the first throttle body (83.1) is in the first throttle body open setting (85.1) in which the first throttle opening gap (87.1) is formed between the first throttle body (83.1) and the first throttle counter-body (84.1) and in which the seal (59) of the secondary valve body (52) remains lifted from the contact surface (63) of the secondary valve seat (55) of the hydraulic block (19)
    and/or
    wherein
    starting from the secondary valve body closed setting (53) in which the secondary control stem (43) is in the secondary control stem closed setting (65) and in which the second throttle body (83.2) of the secondary control stem (43) is in the third throttle body closed setting (88.3) and in which the seal (59) of the secondary valve body (52) tightly bears against the contact surface (63) of the secondary valve seat (55) of the hydraulic block (19) so that the secondary check valve (23) is blocked against throughflow of the drive fluid
    the secondary control stem (43) is transferred in the axial direction (32) in a or the secondary control stem opening direction (67) to the secondary control stem intermediate setting (90.1) in which the second throttle body (83.2) is in the fourth throttle body closed setting (88.4) in which the third throttle closing gap (89.3) or the fourth throttle closing gap is formed between the second throttle body (83.2) and the second throttle counter-body (84.2) and in which the seal (59) of the secondary valve body (52) is lifted from the contact surface (63) of the secondary valve seat (55) of the hydraulic block (19),
    whereupon the secondary control stem (43) is further transferred in the secondary control stem opening direction (67) to the secondary control stem open setting (66) in which the second throttle body (83.2) is in the second throttle body open setting (85.2) in which the second throttle opening gap (87.2) is formed between the second throttle body (83.2) and the second throttle counter-body (84.2) and in which the seal (59) of the secondary valve body (52) remains lifted from the contact surface (63) of the secondary valve seat (55) of the hydraulic block (19).

13. The method according to claim 12, wherein during transfer of the secondary control stem (43) from the secondary control stem intermediate setting (90.1) in the secondary control stem opening direction (67) to the secondary control stem open setting (66) initially the second throttle (82.2), but still not the first throttle (88.1), is opened, for which purpose initially the second throttle body (83.2) is transferred in the secondary control stem opening direction (67) from the second throttle body closed setting (88.2) to a third throttle body open setting (85.3) in which the second throttle opening gap or a third throttle opening gap (87.3) which is larger than the third throttle closing gap (89.3) or the fourth throttle closing gap is formed between the second throttle body (83.2) and the second throttle counter-body (84.2) and the first throttle (82.1) is opened only subsequently, for which purpose the first throttle body (83.1) is further transferred in the secondary control stem opening direction (67) to the first throttle body open setting (85.1) in which the first throttle opening gap (87.1) is formed between the first throttle body (83.1) and the first throttle counter-body (84.1).

14. A method of blocking the secondary check valve (23) of the device (10) according to claim 1,
    wherein
    the secondary control stem (43) is transferred in the axial direction (32) in a secondary control stem closing direction from the secondary control stem open setting (66), in which the first throttle body (83.1) is in the first throttle body open setting (85.1) in which the first throttle opening gap (87.1) is formed between the first throttle body (83.1) and the first throttle counter-body (84.1) and in which the seal (59) of the secondary valve body (52) is lifted from the contact surface (63) of the secondary valve seat (55), to the secondary control stem intermediate setting (90.1) in which the first throttle body (83.1) is in the second throttle body closed setting (88.2) in which the first throttle closing gap (89.1) or the second throttle closing gap is formed between the first throttle body (83.1) and the first throttle counter-body (84.1) and in which the seal (59) of the secondary valve body (52) remains lifted from the contact surface (63) of the secondary valve seat (55) of the hydraulic block (19), whereupon the secondary control stem (43) is further transferred in the secondary control stem closing direction to the secondary control stem closed setting (65) in which the first throttle body (83.1) of the secondary control stem (43) is in the first throttle body closed setting (88.1) in which the first throttle closing gap (89.1) is formed between the first throttle body (83.1) and the first throttle counter-body (84.1) and in which the seal (59) of the secondary valve body (52) tightly bears against the contact surface (63) of the secondary valve seat (55) of the hydraulic block (19) so that the secondary check valve (23) is blocked against throughflow of the drive fluid and/or wherein the secondary control stem (43) is transferred in the axial direction (32) in a or the secondary control stem closing direction from the secondary control stem open setting (66), in which the second throttle body (83.2) is in the second throttle body open setting (85.2) in which the second throttle opening gap (87.2) is formed between the second throttle body (83.2) and the second throttle counter-body (84.2) and in which the seal (59) of the secondary valve body (52) is lifted from the contact surface (63) of the secondary valve seat (55), to the secondary control stem intermediate setting (90.1) in which the second throttle body (83.2) is in the fourth throttle body closed setting (88.4) in which the third throttle closing gap (89.3) or the fourth throttle closing gap is formed between the second throttle body (83.2) and the second throttle counter-body (84.2) and in which the seal (59) of the secondary valve body (52) remains lifted from the contact surface (63) of the secondary valve seat (55) of the hydraulic block (19), whereupon the secondary control stem (43) is further transferred in the secondary control stem closing direction to the secondary control stem closed setting (65), in which the second throttle body (83.2) of the secondary control stem (43) is in the second throttle body closed setting (88.2) in which the third throttle closing gap (89.3) is formed between the second throttle body (83.2) and the second throttle counter-body (84.2) and in which the seal (59) of the secondary valve body (53) tightly bears against the contact surface (63) of the secondary valve seat (55) of the hydraulic block (19) so that the secondary check valve (23) is blocked against throughflow of the drive fluid.

15. The method according to claim 14, wherein during transfer of the secondary control stem (43) in the secondary control stem closing direction from the secondary control stem open setting (66) to the secondary control stem intermediate setting (90.1) initially the first throttle (82.1), but still not the second throttle (82.2), is closed, for which purpose initially the first throttle body (83.1) is transferred in the secondary control stem closing direction from the first throttle body open setting (85.1) to the second throttle body closed setting (88.2) in which the first throttle closing gap (89.1) or the second throttle closing gap is formed between the first throttle body (83.2) and the first throttle counter-body (84.2), and the second throttle (82.2) is closed only subsequently, for which purpose the second throttle body (83.2) is further transferred in the secondary control stem closing direction to the fourth throttle body closed setting (88.4) in which the third throttle closing gap (89.3) or the fourth throttle closing gap is formed between the second throttle body (83.2) and the second throttle counter-body (84.2).

\* \* \* \* \*